United States Patent
Matsuyama

(10) Patent No.: US 9,955,135 B2
(45) Date of Patent: Apr. 24, 2018

(54) IMAGE PROCESSING APPARATUS, IMAGE PROCESSING METHOD, AND PROGRAM WHEREIN A RAW IMAGE TO BE SUBJECTED TO SPECIAL PROCESSING IS PREFERENTIALLY SUBJECTED TO DEVELOPMENT

(71) Applicant: CANON KABUSHIKI KAISHA, Tokyo (JP)

(72) Inventor: Nobuyuki Matsuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 15/035,032

(22) PCT Filed: Dec. 11, 2014

(86) PCT No.: PCT/JP2014/083488
§ 371 (c)(1),
(2) Date: May 6, 2016

(87) PCT Pub. No.: WO2015/098668
PCT Pub. Date: Jul. 2, 2015

(65) Prior Publication Data
US 2016/0373713 A1    Dec. 22, 2016

(30) Foreign Application Priority Data
Dec. 25, 2013    (JP) .................. 2013-267249

(51) Int. Cl.
*H04N 5/76* (2006.01)
*H04N 9/82* (2006.01)
(Continued)

(52) U.S. Cl.
CPC ....... *H04N 9/8205* (2013.01); *H04N 5/23245* (2013.01); *H04N 5/772* (2013.01); *H04N 9/8047* (2013.01)

(58) Field of Classification Search
CPC .................................. H04N 5/23245
See application file for complete search history.

(56) References Cited

FOREIGN PATENT DOCUMENTS

| JP | 2007-104220 A | 4/2007 |
| JP | 2009-147412 A | 7/2009 |

(Continued)

OTHER PUBLICATIONS

PCT/IB/326 (PCT Notification Concerning Transmittal of International Preliminary Report on Patentability).

(Continued)

*Primary Examiner* — Gary C Vieaux
(74) *Attorney, Agent, or Firm* — Cowan, Liebowitz & Latman, P.C.

(57) ABSTRACT

To be able to simply record RAW image data, and quickly output images according to the recorded RAW image data. First, the apparatus can shift operation modes to a still image photographing mode, a still image playing mode, a moving image photographing mode, or a moving image playing mode. Photographed images are subjected to rough development and recorded in a recording medium, and RAW files are generated and recorded. Then, the apparatus shifts to an idle state when processing loads are small in each mode and performs high image quality development processing using the recorded RAW files if high image quality development has not been performed to replace the image files subjected to rough development.

9 Claims, 13 Drawing Sheets

(51) Int. Cl.
*H04N 5/77* (2006.01)
*H04N 9/804* (2006.01)
*H04N 5/232* (2006.01)

(56) References Cited

FOREIGN PATENT DOCUMENTS

| | | |
|---|---|---|
| JP | 2010-268217 A | 11/2010 |
| JP | 2011-244423 A | 12/2011 |
| JP | 2012-044566 A | 3/2012 |
| JP | 2012-100022 A | 5/2012 |
| JP | 2013-179520 A | 9/2013 |
| JP | 2014-017641 A | 1/2014 |

OTHER PUBLICATIONS

PCT/IB/373 (PCT International Preliminary Report on Patentability).
PCT/ISA/237 (PCT Written Opinion of the International Searching Authority).

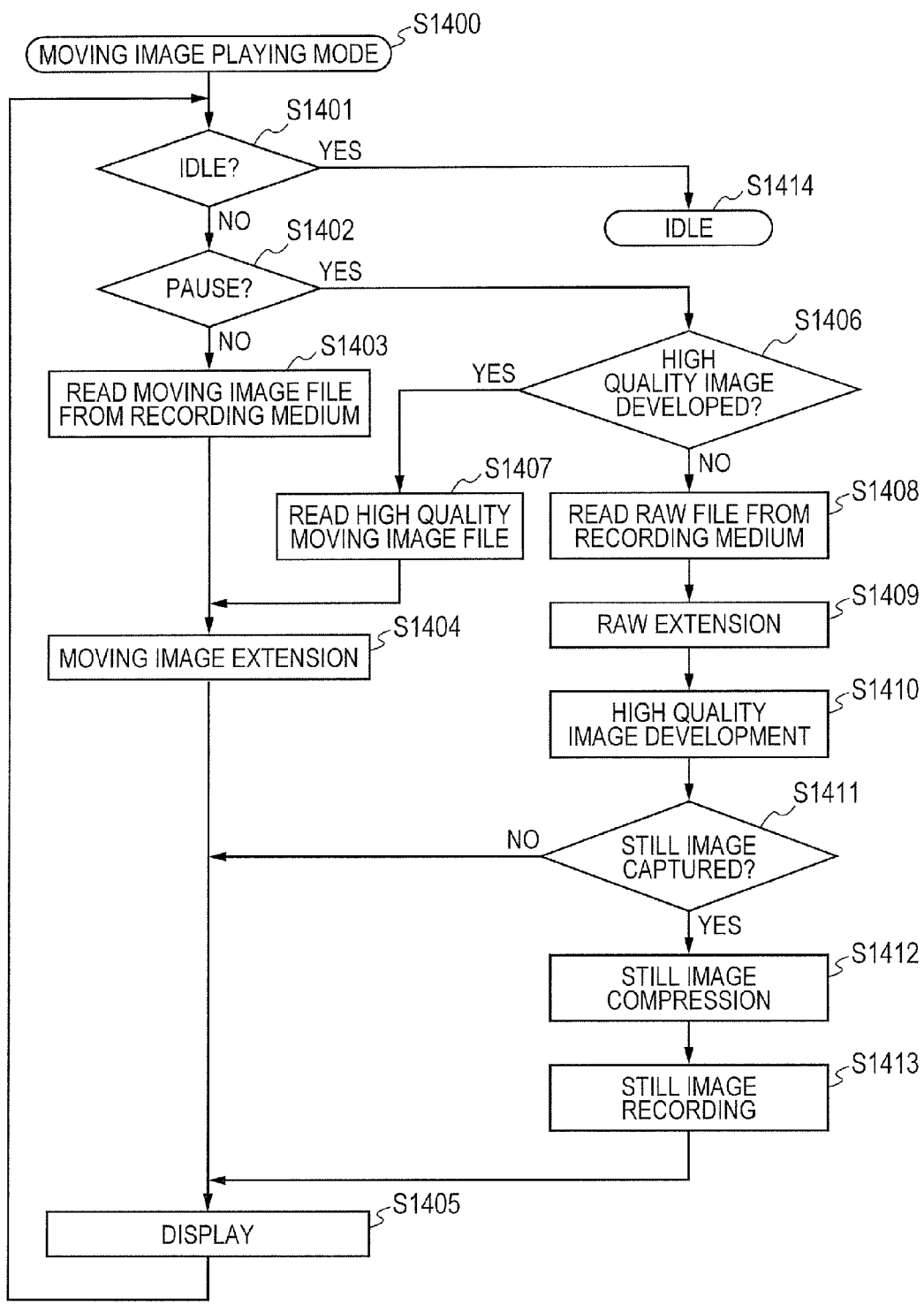

IMAGE PROCESSING APPARATUS, IMAGE PROCESSING METHOD, AND PROGRAM WHEREIN A RAW IMAGE TO BE SUBJECTED TO SPECIAL PROCESSING IS PREFERENTIALLY SUBJECTED TO DEVELOPMENT

CROSS-REFERENCE TO RELATED APPLICATIONS

This application claims priority to International Application No. PCT/JP2014/083488 filed on Dec. 11, 2014, the entire disclosure of which is hereby incorporated by reference.

TECHNICAL FIELD

The present invention relates to an image processing apparatus, an image processing method, and a program suitably used for development processing for making images proper.

BACKGROUND ART

In prior-art imaging apparatuses, raw image information (RAW image data) generated by an image sensor is subjected to de-Bayer processing (de-mosaic processing) and converted to a signal made of brightness and a color difference, and development processing such as noise elimination, optical strain correction, and making images proper for each signal is performed. In general, the brightness signal and the color-difference signal subjected to development processing are compressed and coded, and image data is recorded in a recording medium.

On the other hand, there are imaging apparatuses capable of recording RAW image data. The RAW image data includes a huge amount of data required for recording, but it has a merit that correction or degrading of original images can be minimized and edited after photographing, and is therefore preferred by experts. A configuration of an imaging apparatus for recording the RAW image data disclosed as an example is such that development parameters are recorded together with the RAW image data, and development and playing of the RAW image data are performed by using the development parameters in playing.

CITATION LIST

Patent Literature

PTL 1: Japanese Patent Application Laid-Open No. 2011-244423

SUMMARY OF INVENTION

Technical Problem

In imaging apparatuses of recent years, image sensors are advancing, and the number of pixels in a single image is significantly increasing. Additionally, the number of images that can be photographed per second in continuous shoot photography has also tended to increase. As a result, the processing load for development processing such as de-Bayer processing, noise elimination and optical strain correction of RAW image data is synergistically increasing. Accordingly, in order to perform all development processing in real time in parallel with photographing, an enormous circuit and power consumption are necessary. Further, when the amount of space occupied by the circuit and power consumption is limited due to the development processing, there are cases where high photographing performance cannot be realized.

On the other hand, when a configuration is adopted in which RAW image data is recorded without being developed, such as in PTL 1, the processing load for development at the time of photographing is reduced. However, because the RAW image data is recorded in an undeveloped state, development processing must be performed when the images are to be displayed. Thus, it is difficult to quickly display or print out the images. Furthermore, because RAW image data is peculiar data, some devices cannot play or develop the RAW image data. Accordingly, the conventional recording scheme of RAW image data may sacrifice user-friendliness.

As described above, a conventional imaging apparatus which can record RAW image data can achieve high photographing performance, but cannot quickly and easily output the images according to the RAW image data.

The present invention was made in view of the aforementioned problem, and an object thereof is to be able to simply record RAW image data and quickly output images according to the recorded RAW image data.

Solution to Problem

According to an aspect of the present invention, an imaging apparatus comprises: an imaging unit; a recording unit configured to record, in a recording medium, RAW image data generated by the imaging unit without development processing; a first development unit configured to subject the RAW image data recorded in the recording medium to the development processing, to generate a first developed image; a determining unit configured to determine an operation mode of the imaging apparatus; and a setting unit configured to set a priority in an order of the developments of a plurality of RAW images recorded in the recording medium, according to kinds of the operation modes of the imaging apparatus determined by the determining unit.

Advantageous Effects of Invention

According to the present invention, the RAW image data can be easily recorded, and an image relating to the recorded RAW image data can be quickly output.

Further features of the present invention will become apparent from the following description of exemplary embodiments with reference to the attached drawings.

BRIEF DESCRIPTION OF DRAWINGS

FIG. 14 illustrates a flowchart illustrating an example of a processing procedure in a moving image playing mode of the embodiment of the present invention.

DESCRIPTION OF EMBODIMENTS

Figure 1:
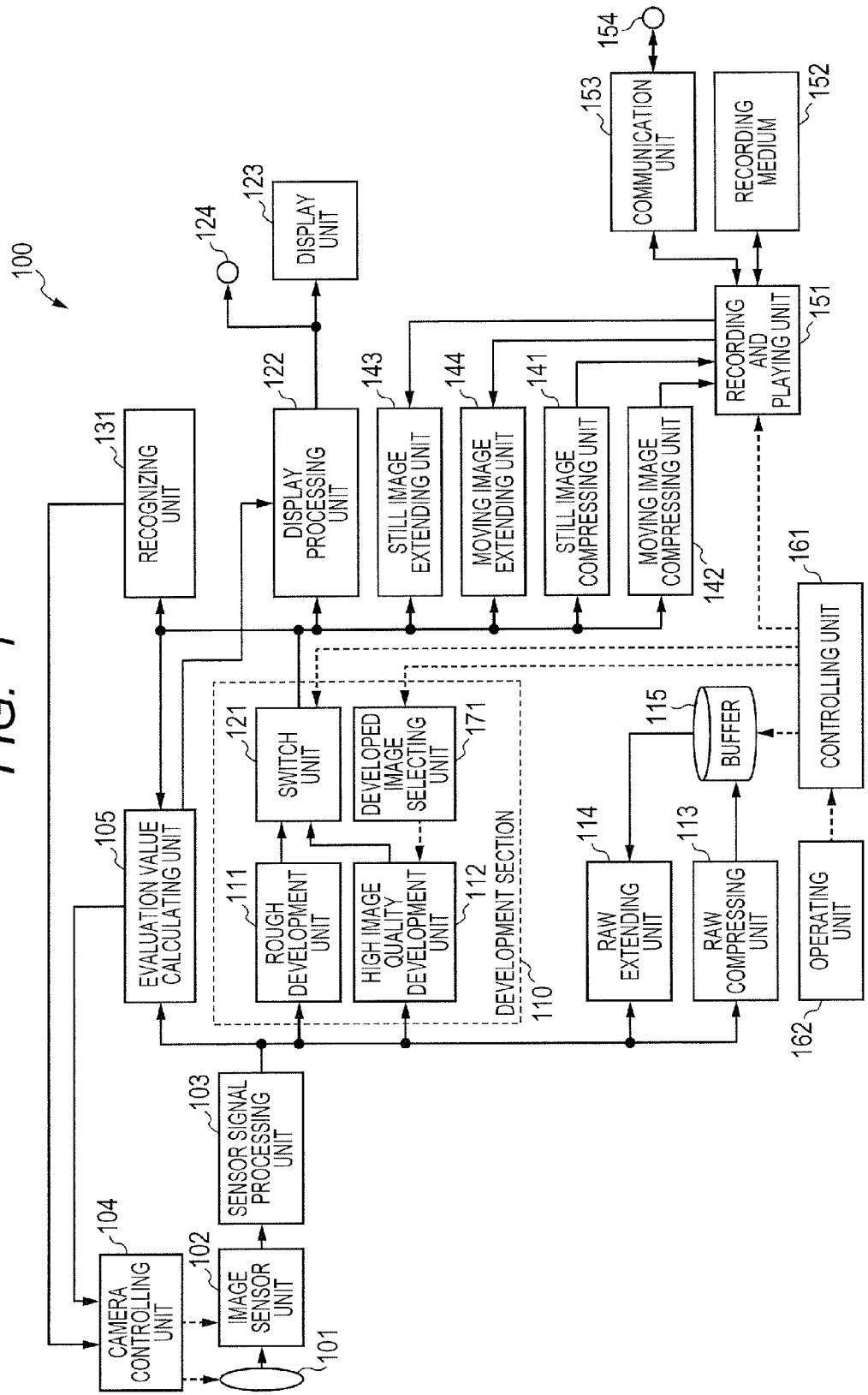
FIG. 1 is a block diagram illustrating a configuration example of an imaging apparatus according to an embodiment of the present invention.

An embodiment of the present invention will be described below in detail by referring to the attached drawings. FIG. 1 is a block diagram illustrating a configuration example of an imaging apparatus 100 according to this embodiment. The imaging apparatus 100 illustrated in FIG. 1 has a function of playing image data from a recording medium, subjecting it to development processing and displaying it, and a function of transmitting/receiving the image data to/from external apparatuses and servers (cloud), in addition to a function of recording of the image data acquired by imaging a subject in a recording medium.

In FIG. 1, a controlling unit 161 includes a CPU and a memory storing a control program executed by the CPU and controls all processing of the imaging apparatus 100. An operating unit 162 includes input devices such as keys, buttons, and a touch panel used by a user for giving instructions to the imaging apparatus 100. An operation signal from the operating unit 162 is detected by the controlling unit 161 and the imaging apparatus 100 is controlled by the controlling unit 161 so that operations according to the user input are performed. A display unit 123 includes a liquid crystal display (LCD) for displaying images photographed or played, a menu screen, and various types of information in the imaging apparatus 100.

When start of a photographing operation is instructed by the operating unit 162, an optical image of an object to be an imaging target is input through an imaging optical unit 101 and imaged on an image sensor unit 102. At photographing, operations of the imaging optical unit 101 and the image sensor unit 102 are controlled by a camera controlling unit 104 on the basis of evaluation value calculation results of diaphragm, focusing, and camera shake acquired by an evaluation value calculating unit 105 and subject information extracted by a recognizing unit 131.

Figure 2:
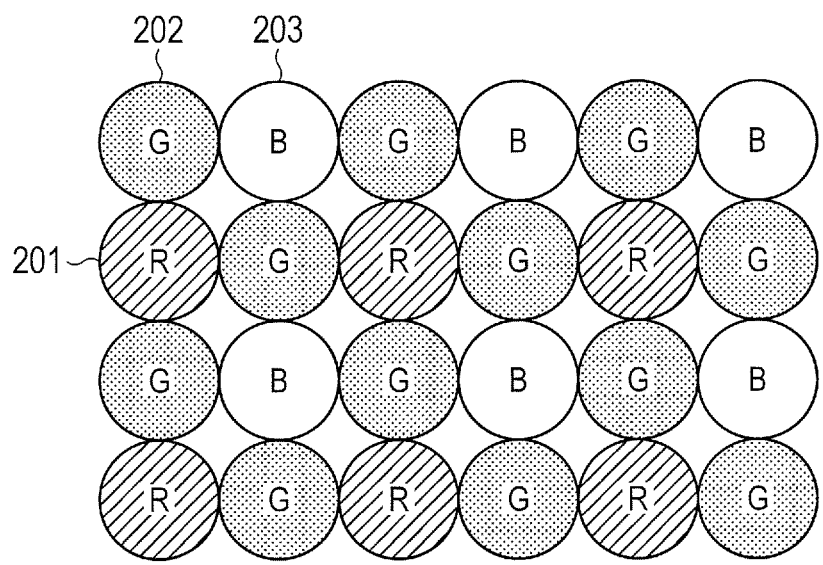
FIG. 2 is a diagram illustrating an example of a color filter arranged in an image sensor unit.

The image sensor unit 102 converts light transmitted through color filters of red (R), green (G), and blue (B) arranged for each pixel to electric signals. FIG. 2 is an example of color filters arranged in the image sensor unit 102 and illustrates a pixel arrangement of an image handled by the imaging apparatus 100. As illustrated in FIG. 2, red (R) 201, green (G) 202, and blue (B) 203 pixels are arranged in a mosaic manner for each pixel and have a structure in which one red pixel, one blue pixel, and two green pixels for four pixels of 2×2 are regularly arranged as one set. Such arrangement of the pixels is generally called a Bayer array.

The electric signal converted by the image sensor unit 102 is subjected to repair processing of pixels by a sensor signal processing unit 103. The repair processing includes processing of interpolation of a pixel of a repair target using peripheral pixel values to a value with a missing pixel or a pixel with low reliability and subtraction of a predetermined offset value in the image sensor unit 102. In this embodiment, RAW image data is output as image data output from the sensor signal processing unit 103.

The RAW image data output from the sensor signal processing unit 103 is subjected to development processing in a development section 110. The development section 110 includes a rough development unit 111 and a high image quality development unit 112 as development processing units for executing a plurality of different image processes. Moreover, a switch unit 121 for selecting those outputs and a developed image selecting unit 171 for selecting the RAW image data to be processed in the high image quality development unit 112 are provided. The rough development unit 111 and the high image quality development unit 112 apply de-Bayer processing (de-mosaic processing) to the RAW image data, respectively, convert it to a signal made of brightness and a color difference, eliminate noises included in each signal and correct optical strain. As described above, so-called development processing such as making images proper is executed.

In particular, the high image quality development unit 112 executes respective processes with higher accuracy than the rough development unit 111 and thus, a higher quality developed image than the rough development unit 111 can be acquired, but a processing load is correspondingly larger. Thus, the high image quality development unit 112 of this embodiment is not specialized in real-time development performed in parallel with photographing but is configured to be capable of executing distributed processing, taking time after photographing. By executing such high image quality development processing not in photographing but later by taking time, a temporary increase in power consumption and circuit scale can be suppressed.

On the other hand, the rough development unit 111 is configured such that a processing amount relating to development is small and high-speed development processing can be executed during photographing, although its image quality is lower than that of the high image quality development unit 112. Since the processing load of the rough development unit 111 is small, the rough development unit 111 is used in real-time development in parallel with a photographing operation. As described above, in the rough development unit 111, the RAW image data is subjected to development processing in the order of photographing, but since the development processing in the high image quality development unit 112 is executed after the photographing, development processing does not necessarily have to be executed in the order of photographing.

The developed image selecting unit 171 selects the RAW image data to be processed in the high image quality development unit 112 on the basis of information relating to operation contents instructed from the user by the operating unit 162 and an operation mode being executed, provided by the controlling unit 161. Similarly, the switch unit 121 is switched by the controlling unit 161 in accordance with control according to the operation contents instructed from the user by the operating unit 162 and the operation mode being executed.

In this embodiment, a configuration in which the rough development unit 111 and the high image quality development unit 112 are independently present in the development section 110 is illustrated, but one development unit may switch the operation mode and exclusively execute processing of rough development and high image quality development.

Image data subjected to development processing by the development section 110 is subjected to predetermined display processing in a display processing unit 122 and then, the image is displayed by the display unit 123. The image data subjected to development processing may be output to display devices connected to external devices by an image output terminal 124. The image output terminal 124 includes a general-purpose interface such as HDMI or SDI, for example. The image data subjected to development processing by the development section 110 is also supplied to the evaluation value calculating unit 105, and the evaluation value calculating unit 105 calculates an evaluation value such as a focusing state and exposure state from the image data.

The image data subjected to development processing by the development section 110 is also supplied to the recognizing unit 131. The recognizing unit 131 has a function of detecting and recognizing subject information in the image. For example, if a face is present in the screen shown on the image, the face is detected, information indicating a position of the face is output, and authentication of a specific person is made on the basis of feature information of the face and the like.

The image data subjected to development processing by the development section 110 is also supplied to a still image compressing unit 141 and a moving image compressing unit 142. At this time, if the image data is to be compressed as still image data, the still image compressing unit 141 is used, while if the image data is to be compressed as moving image data, the moving image compressing unit 142 is used. The still image compressing unit 141 and the moving image compressing unit 142 subject respective image data to be targets to high-efficiency encoding (compression encoding) so as to generate image data in which the amount of information is compressed and to convert it to an image file (still image file or moving image file). If the still image data is to be compressed, a JPEG method or the like is used, while if the moving image data is to be compressed, an MPEG-2 method, an H.264 method, an H.265 method or the like can be used.

A RAW compressing unit 113 subjects the RAW image data output from the sensor signal processing unit 103 to high efficiency encoding by using technologies such as wavelet transformation or differential encoding, converts it to a RAW file in a compressed state and stores it in a buffer unit 115. The RAW file can be held in the buffer unit 115 and can be read out again, but it may be moved to and recorded in another recording medium after being stored in the buffer unit 115 and deleted from the buffer unit 115.

The RAW file, the above-described still image file and moving image file are recorded in a recording medium 152 by a recording and playing unit 151. The recording medium 152 is a built-in large capacity memory, a hard disk or a detachable memory card. The recording and playing unit 151 can read out still image files, moving image files and RAW files from the recording medium 152.

Moreover, the recording and playing unit 151 can write or read various files in or from external storages and servers through a communication unit 153. The communication unit 153 has a configuration capable of making an access to the Internet or external devices via wireless communication or wired communication by using a communication terminal 154.

When a playing operation is started, the recording and playing unit 151 acquires and plays a desired file from the recording medium 152 or through the communication unit 153. If the file to be played is a RAW file, the recording and playing unit 151 stores the acquired RAW file in the buffer unit 115. If the file to be played is a still image file, the recording and playing unit 151 supplies the acquired still image file to a still image extending unit 143. If the file to be played is a moving image file, the recording and playing unit 151 supplies the acquired moving image file to a moving image extending unit 144.

A RAW extending unit 114 reads out the RAW file stored in the buffer unit 115 and decodes and extends the RAW file in a compressed state. The RAW file extended by the RAW extending unit 114 is supplied to the rough development unit 111 or the high image quality development unit 112 in the development section 110. The still image extending unit 143 decodes and extends the input still image file and supplies it as a played image of the still image data to the display processing unit 122. The moving image extending unit 144 decodes and extends the input moving image file and supplies it as a played image of the moving image data to the display processing unit 122.

Figure 3:
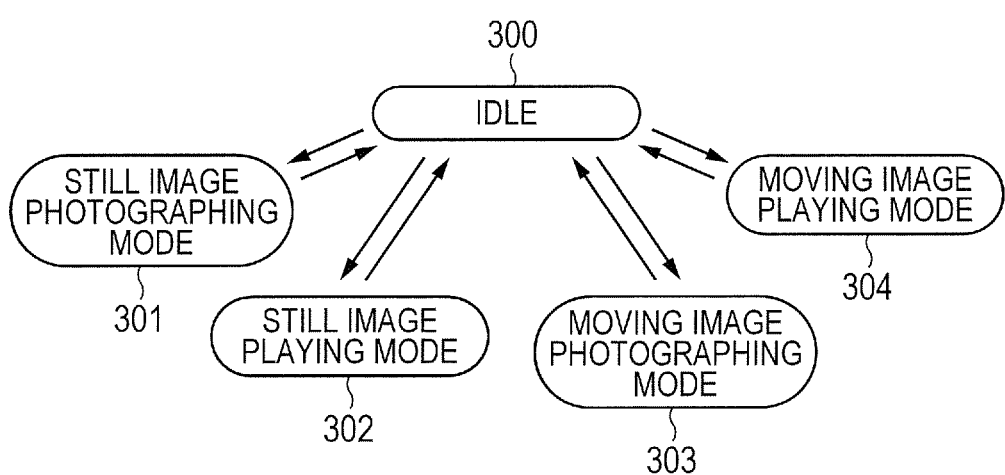
FIG. 3 is a state transition diagram illustrating transition of each operation mode.

Next, operation modes of the imaging apparatus 100 of this embodiment will be described in detail by using FIG. 3. FIG. 3 is a state transition diagram illustrating transition of each operation mode in the imaging apparatus 100. Such transition of the operation mode is executed in conformity to an instruction from the operating unit 162 or determination of the controlling unit 161, and the transition is made manually in accordance with the operation or made automatically. As illustrated in FIG. 2, the imaging apparatus 100 operates while switching as appropriate among four modes, that is, a still image photographing mode 301, a still image playing mode 302, a moving image photographing mode 303 or a moving image playing mode 304 via an idle state 300.

Figure 4:
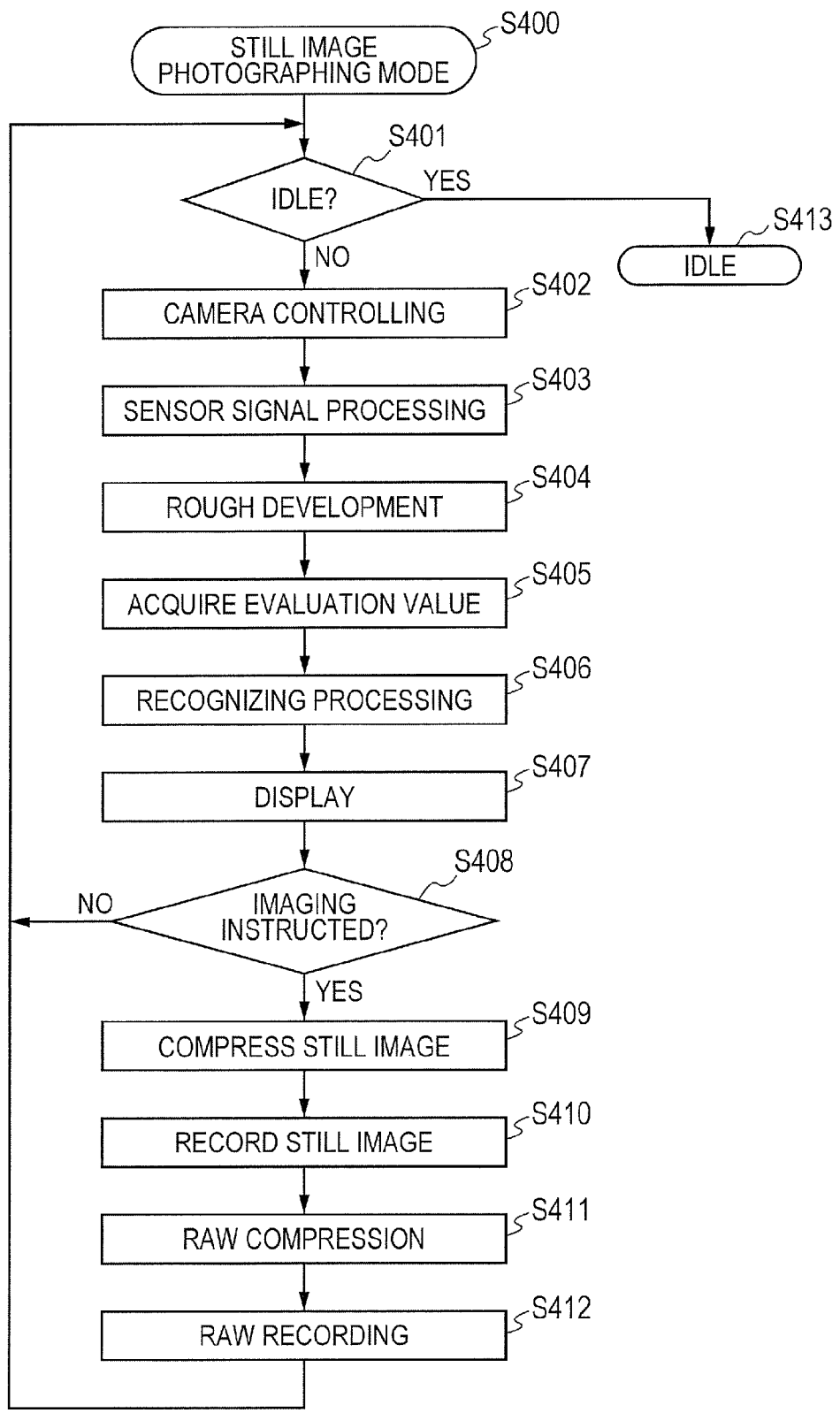
FIG. 4 illustrates a flowchart illustrating an example of a processing procedure in a still image photographing mode of the embodiment of the present invention.

First, an operation in the still image photographing mode 301 of the imaging apparatus 100 will be described. FIG. 4 illustrates a flowchart illustrating an example of a processing procedure in the still image photographing mode of this embodiment. The flowchart illustrated in FIG. 4 illustrates a processing procedure executed by controlling each processing block by the controlling unit 161. It is realized when a program stored in a memory (ROM) in the controlling unit 161 is expanded to a memory (RAM) and is executed by the CPU.

When processing of the still image photographing mode is started at S400 in FIG. 4, at S401, the controlling unit 161 determines whether or not a processing load of the imaging apparatus 100 is low and transition should be made to the idle state. At this time, it is assumed that if the processing load is low, transition to the idle state is made at a frequency according to the load situation. As the result of this determination, if transition should be made to the idle state, transition is made to the idle state (S413), while if not, the routine proceeds to S402. For example, during high-speed continuous shoot photographing, the processing load is high, and transition to S413 is not made but the routine proceeds to S402 at all times. On the other hand, if usual single photographing is performed, transition is made to S413 between a first photographing and second photographing at a half frequency, for example. Details of this idle state will be described later.

At the subsequent S402, the camera controlling unit 104 controls operations of the imaging optical unit 101 and the image sensor unit 102 so that photographing is performed under a suitable condition. For example, in accordance with instructions by a user on zooming or focusing, a lens included in the imaging optical unit 101 is moved or a read-out region of the image sensor unit 102 is set in accordance with an instruction of a number of photographing pixels. Focusing adjustment or tracking of a specific subject is also controlled on the basis of information of an evaluation value supplied from the evaluation value calculating unit 105 and the recognizing unit 131, which will be described later, and subject information.

Subsequently, at S403, the sensor signal processing unit 103 subjects the electric signals converted by the image sensor unit 102 to signal processing for repairing pixels. By means of this processing, RAW image data is generated. At S404, the rough development unit 111 subjects the RAW image data to development processing. At this time, the controlling unit 161 switches the switch unit 121 in the development section 110 and selects an output of the image data subjected to the development processing in the rough development unit 111.

Here, the development processing (rough development) executed by the rough development unit 111 will be described. The rough development unit 111 realizes high-speed processing or rough processing of development by limiting an image size after development to 2 million pixels or less or by keeping noise elimination or optical strain correction to limited processing or by omitting it. When the rough development unit 111 executes processing after reducing the image size or partially limits a function of the development processing, the imaging apparatus 100 can realize photographing with performance of 60 frames per second of 2 million pixels, for example, with a small circuit scale and less power consumption.

The image data subjected to the development processing in the rough development unit 111 is supplied to the evaluation value calculating unit 105. Subsequently, at S405, the evaluation value calculating unit 105 calculates an evaluation value such as a focus state and an exposure state from a brightness value and a contrast value included in the image data. The evaluation value calculating unit 105 may acquire the RAW image data before the development processing and calculate the evaluation value similarly from the RAW image data.

The image data subjected to the development processing in the rough development unit 111 is also supplied to the recognizing unit 131. At S406, the recognizing unit 131 detects a subject such as a face from the image data subjected to the development processing and recognizes the subject information. On the basis of the presence of a face in the image, its position or authentication of a specific person, for example, the result is generated as information.

The image data subjected to the development processing in the rough development unit 111 is also supplied to the display processing unit 122. At S407, the display processing unit 122 forms a display image from the acquired image data, outputs it to the display unit 123 or an external display device and displays the image. The image displayed on the display unit 123 is used for live-view display (photographing-through image display) for the user to appropriately frame the subject in the still image photographing mode.

The display image may be displayed by other display devices such as an external TV set from the display processing unit 122 via the image output terminal 124. The display processing unit 122 can also display markings or the like at the same time by using the evaluation values calculated by the evaluation value calculating unit 105 and the subject information generated by the recognizing unit 131. For example, a marking can be displayed on a focusing region of a focus on the display image or a frame can be displayed at a position of the recognized face.

Subsequently, at S408, the controlling unit 161 determines whether or not a photographing instruction has been input by an operation of the user from the operating unit 162. As the result of this determination, if a photographing instruction is input, the routine proceeds to S409. On the other hand, if the photographing instruction has not been input as the result of the determination at S408, the routine returns to S401, and a preparation operation for the photographing and the live-view display are repeated.

Subsequently, in response to the photographing instruction at S408, the still image compressing unit 141 acquires image data subjected to the development processing in the rough development unit 111 at S409. Then, the still image compressing unit 141 subjects the acquired image data to high-efficiency encoding processing (still image compression) and generates a still image file. The still image compressing unit 141 executes compression processing by using a known still image compression technology such as JPEG. At S410, the recording and playing unit 151 records the still image file in the recording medium 152.

In response to the photographing instruction at S408, the RAW compressing unit 113 acquires the RAW image data corresponding to the photographed still image from the sensor signal processing unit 103 at S411, subjects the RAW image data to high-efficiency encoding (RAW compression) and converts it to a RAW file. Then, the RAW file is stored in the buffer unit 115.

The high-efficiency encoding executed by the RAW compressing unit 113 is assumed to be processed by a known technology such as wavelet transformation and differential encoding but it may be irreversible encoding or reversible encoding. Alternatively, the RAW compression by the RAW compressing unit 113 may be omitted, and the RAW image data may be stored in the buffer unit 115 still in a non-compressed state. In this embodiment, regardless of the presence of the RAW compression, a RAW file that can be restored as a high image quality file is generated without largely damaging the RAW image data supplied from the sensor signal processing unit 103.

Subsequently, at S412, the recording and playing unit 151 records the RAW file stored in the buffer unit 115 in the recording medium 152 and then, the routine proceeds to S401. At S410 and S412, the recording and playing unit 151 may send the still image file or the RAW file from a communication terminal 154 to an external storage via the communication unit 153 and record it in the external storage.

Figure 5A:
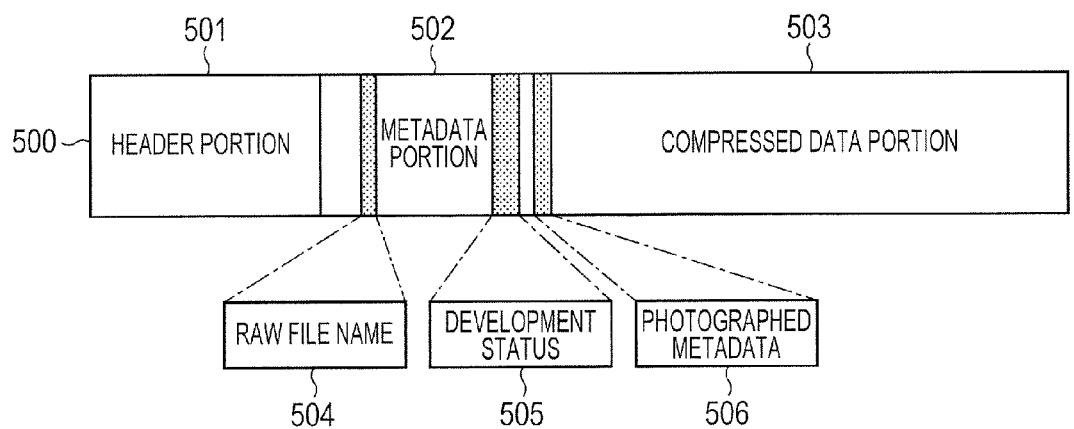
FIGS. 5A and 5B are diagrams illustrating configuration examples of a still image file and its RAW file.
Figure 5B:
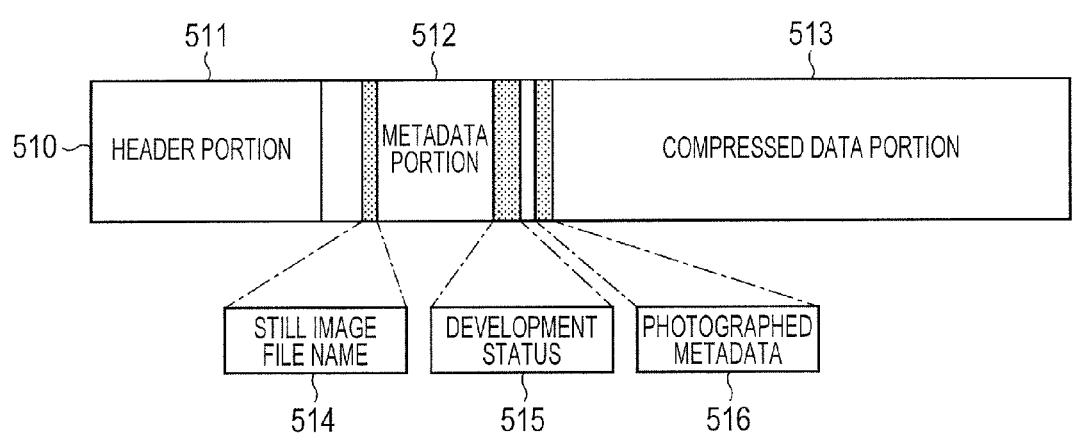

Here, structures of the still image file and the RAW file according to this embodiment will be described. FIGS. 5A and 5B are diagrams illustrating configuration examples of a still image file 500 and a RAW file 510. The still image file 500 illustrated in FIG. 5A is recorded in a predetermined recording area of the recording medium 152, for example, by the recording and playing unit 151. The still image file 500 includes a header portion 501, a metadata portion 502, and a compressed data portion 503. The header portion 501 includes an identification code indicating that this file is in a format of the still image file 500. The compressed data portion 503 includes compressed data of the still image subjected to high-efficiency encoding.

The metadata portion 502 includes information 504 of a file name of the RAW file 510 generated with this still image file 500. Information 505 of a development status indicating that this still image file 500 is subjected to rough development by the rough development unit 111 is also included. The metadata portion 502 includes the evaluation value calculated by the evaluation value calculating unit 105, the subject information detected by the recognizing unit 131, and photographed metadata 506 including information at photographing of the imaging optical unit 101 and the image sensor unit 102. The information at photographing includes lens type identification information and sensor type identification information, for example. The metadata portion 502 may further include an identification code of the recording medium in which the RAW file 510 generated at the same time is recorded and path information of a recorded folder.

On the other hand, the RAW file 510 illustrated in FIG. 5B is recorded in a predetermined recording area of the recording medium 152, for example, by the recording and playing unit 151. The RAW file 510 comprises a header portion 511, a metadata portion 512, and a compressed data portion 513. The header portion 511 includes an identification code indicating that this file is in a format of the RAW file 510. The compressed data portion 513 includes the RAW image data of the still image subjected to high-efficiency encoding. The RAW image data of the non-compressed still image may be included in the compressed data portion 5B.

The metadata portion 512 includes information 514 of a file name of the still image file 500 generated with this RAW file 510. Information 515 of a development status indicating that this still image file 500 is subjected to rough development by the rough development unit 111 is also included. The metadata portion 512 also includes the evaluation value calculated by the evaluation value calculating unit 105, the subject information detected by the recognizing unit 131, and photographed metadata 516 including information at photographing of the imaging optical unit 101 and the image sensor unit 102. The information at photographing includes lens type identification information, sensor type identification information, photographing type information such as continuous shoot photographing or bracketing, time information when the RAW file 510 was generated, for example. The metadata portion 512 may further include an identification code of the recording medium in which the still image file 500 generated at the same time is recorded and path information of a recorded folder. Alternatively, the still image file 500 itself generated at the same time may be made into metadata and stored in the metadata portion 512.

The above-described structures of the various files of the still image according to this embodiment are only examples and the configurations may conform to standards such as DCF and EXIF.

As described above, in the imaging apparatus 100 according to this embodiment, the rough development unit 111 executes development processing of an image on live-view display until the photographing instruction in the still image photographing mode is performed and the still image data generated in response to the photographing instruction. The rough development unit 111 limits the image size after development to 2 million pixels or less or keeps noise elimination or optical strain correction to a limited processing or omits it. As a result, the development processing with performance of 60 frames per second for 2 million pixels, for example, can be realized with a small circuit scale and less power consumption.

On the other hand, the imaging apparatus 100 according to this embodiment generates a RAW file in response to the photographing instruction of the still image as described above. The RAW file is a high image quality file without largely damaging an image quality of the image data supplied from the sensor signal processing unit 103, and generation of this file does not require the development processing. Thus, while the number of pixels in the image and a speed of continuous shoot photographing are increased, the RAW file can be recorded with a small-scale circuit and less power consumption.

Figure 6:
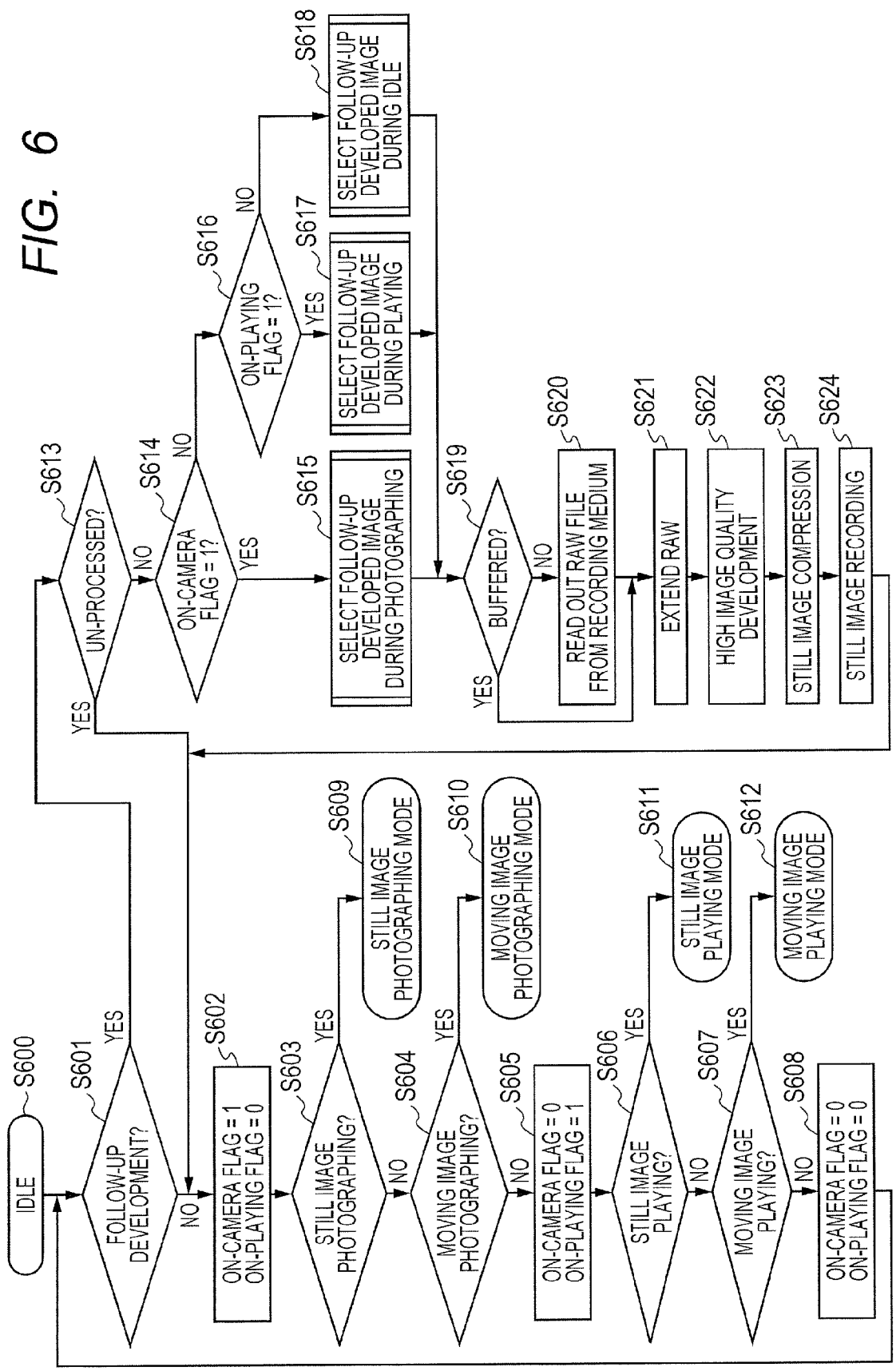
FIG. 6 is a flowchart illustrating an example of a follow-up development processing procedure in an idle state of the embodiment of the present invention.

Subsequently, S413 which is a step changed from S401 in FIG. 4 will be described by using a flowchart in FIG. 6. FIG. 6 is a flowchart illustrating an example of a follow-up development processing procedure in the idle state of this embodiment. The flowchart illustrated in FIG. 6 illustrates a processing procedure executed by the controlling unit 161 by controlling each of the processing blocks. It is realized when a program stored in the memory (ROM) in the controlling unit 161 is expanded to the memory (RAM) and is executed by the CPU.

In FIG. 6, when the processing in the idle state is started at S600, the controlling unit 161 determines whether or not the follow-up development is to be executed by the setting operated by the user at S601. Details of this follow-up development will be described later. If the follow-up development is not to be executed as the result of this determination, the routine proceeds to s602, while if the follow-up development is to be executed, transition is made to S613.

At the subsequent S602 to S612, the controlling unit 161 determines to which of the still image photographing mode 301, the still image playing mode 302, the moving image photographing mode 303, and the moving image playing mode 304 illustrated in FIG. 3 the transition is to be made in accordance with the current mode setting from the user.

First, at S602, the controlling unit 161 sets an on-camera flag to 1 and sets an on-playing flag to 0. At S603, it is determined whether or not the still image photographing mode is set. If the still image photographing mode is set as the result of this determination, the routine proceeds to S609, and transition is made to the still image photographing mode illustrated in FIG. 4. On the other hand, if the still image photographing mode is not set as the result of the determination at S603, it is determined whether or not the moving image photographing mode is set at S604. If the moving image photographing mode is set as the result of this determination, the routine proceeds to S610, and transition is made to the moving image photographing mode, which will be described later.

On the other hand, if the moving image photographing mode is not set as the result of the determination at S604, the controlling unit 161 sets the on-camera flag to 0 and the on-playing flag to 1 at S605. Then, it is determined whether or not the still image playing mode is set at S606. If the still image playing mode is set as the result of this determination, the routine proceeds to S611, and transition is made to the still image playing mode, which will be described later. On the other hand, if the still image playing mode is not set as the result of the determination at S606, it is determined whether or not the moving image playing mode is set at S607. If the moving image playing mode is set as the result of this determination, the routine proceeds to S612, and transition is made to the moving image playing mode, which will be described later.

On the other hand, if the moving image playing mode is not set as the result of the determination at S607, the controlling unit 161 sets the on-camera flag to 0 and the on-playing flag to 0 at S608. Then, the routine returns to S601.

Here, the follow-up development is processing in which, after the photographing operation is finished, high image quality development processing is executed again by using the RAW file recorded in the buffer unit 115 or the recording medium 152 as a source so as to generate a high image quality display image or a high image quality still image file. The RAW file to be a target of the follow-up development according to this embodiment is intended for both a still image and a moving image, but a still image will be described below as an example.

As described above, the still image file generated at photographing has been developed in the rough development unit 111, and thus its number of pixels might be 2 million pixels or less, or a part of the development processing is omitted, and the image quality is limited. This image quality can be sufficient for roughly checking photographed contents, but the image quality might not be sufficient for checking details of the image or for an application for print-out.

On the other hand, the RAW file generated with the still image is of high quality not largely damaging the image quality of the image data supplied from the sensor signal processing unit 103. However, since the RAW file is data before the development processing, it cannot be displayed or printed immediately and requires a long time for RAW development. Moreover, since the RAW file is not a widely spread file as JPEG, playable environments where the RAW file can be handled are also limited.

Thus, in this embodiment, in the follow-up development, the RAW file which has already been recorded is read out, high image quality development processing is executed by the high image quality development unit 112, and the generated still image file is recorded in the recording medium 152 or the like. In this embodiment, this sort of follow-up development is executed in a state in which the apparatus is waiting for an operation by the user and the processing load is relatively small, such as between taking photographs or while the apparatus is in a playing mode or a sleep state. Without being limited to the case of following a direct instruction of the user, the controlling unit 161 can be set to automatically execute the follow-up development according to the setting.

By configuring the apparatus in this way, execution of excessive development processing on each occasion can be made unnecessary when the user wants to output a high quality image at a later time such as for checking details of the image or printing out the image. The files can also be used in an ordinary environment in the same manner as conventional still image files.

For a single photographing instruction, a still image file and a RAW file are recorded in the recording medium 152 or the like as a set. When follow-up development is executed as a result of the determination at S601 due to a direct instruction from the user or because predetermined set conditions are met, the controlling unit 161 determines whether follow-up development processing has been completed or not for each set of files (S613).

As the determination method, the controlling unit 161 may refer to the development status information 505 stored in the metadata portion 502 of the still image file 500, for example. Then, in the development status information 505, the controlling unit 161 refers to a flag for identifying whether the still image file has been subjected to processing by the rough development unit 111, and determines whether follow-up development has been completed or not based on this flag. The determination can be made in the same way for the RAW file 510. Alternatively, the determination can be made by preparing a separate table file indicating the development processing statuses for a series of photographed still images.

If follow-up development processing has been completed as the result of the determination in S613, the routine transitions to S602. On the other hand, if follow-up development processing has not been completed, the routine transitions to S614. Here, if a plurality of pieces of RAW image data which have not been subjected to follow-up development processing are to be subjected to follow-up development processing, development may be executed in the order in which the photos were taken, but in this embodiment the order in which follow-up development processing is executed is changed as appropriate according to an instruction from the user and the operation mode. Thereby, the high quality image required by the user can be provided at the necessary timing.

In S614, the developed image selecting unit 171 determines whether or not the value of the on-camera flag is 1. If the on-camera flag is 1 as the result of this determination, the developed image selecting unit 171 selects RAW image data during photographing in S615. The details of this process are described later referring to FIG. 7.

On the other hand, if the on-camera flag is not 1 as the result of the determination in S614, the developed image selecting unit 171 determines whether or not the value of the on-playing flag is 1 in S616. If the on-playing flag is 1 as the result of this determination, the developed image selecting unit 171 selects RAW image data during playing in S617. The details of this process are described later referring to FIG. 8. On the other hand, if the on-playing flag is not 1 as the result of the determination in S616, the developed image selecting unit 171 selects RAW image data during idle in S618. The details of this process are described later referring to FIG. 9.

Figure 7:
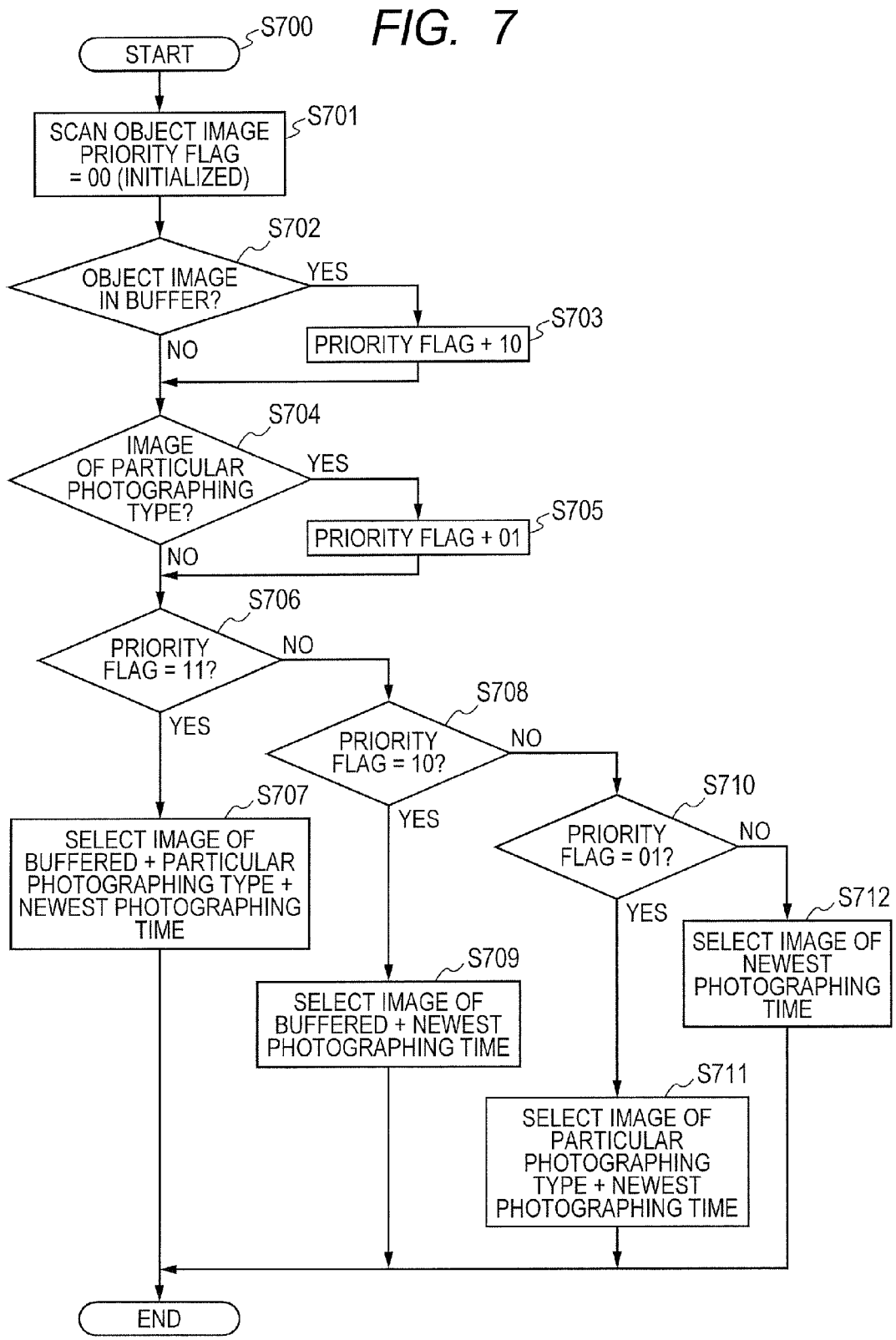
FIG. 7 is a flowchart illustrating an example of a processing procedure for selecting RAW image data to be a target of follow-up development during photographing.

FIG. 7 is a flowchart illustrating an example of a processing procedure in which the developed image selecting unit 171 selects RAW image data to be a target of follow-up development during photographing. When image data is selected to perform follow-up development during photographing, processing is performed with the objective of maximizing the number of images to be follow-up developed per unit of time.

In this processing, the parameter of first priority is that the image data to be a target of follow-up development is in the buffer unit 115. Thereby, when follow-up development processing is executed, no time is required for reading out the image data from the recording medium 152 or the like, and thus follow-up development processing can be performed quickly.

Next, because it can be determined that an image for which continuous shoot photographing or bracketing photographing was performed is relatively more important to the user than an image which is not that type, whether or not image data was generated by this type of photography is the parameter of second priority. Thereby, when the user gives an instruction to display or print out the image after photographing, the instruction can be immediately carried out. A plurality of pieces of RAW image data are generated in continuous shoot photographing or bracketing photographing, and these groups of images become the target of follow-up development.

Here, follow-up development processing may be performed for all of these pieces of RAW image data, but in this embodiment, a piece of RAW image data is selected from a group of images as a representative image. Specifically, for example, the first image is selected in continuous shoot photographing, and a taken image is selected according to a reference setting value in bracketing photographing, as the representative image. If more than a predetermined number of photos are taken in continuous shoot photographing, intermediate images every predetermined number from the first image may also be selected as representative images.

In S700 of FIG. 7, upon starting the process, in S701, the developed image selecting unit 171 extracts candidate pieces of RAW image data to be a target of follow-up development and scans the statuses thereof, as well as initializing priority flags used for internal processing to 0. Next, in S702, whether or not the candidate pieces of RAW image data to be a target of follow-up development are in the buffer unit 115 is determined. If the RAW image data is in the buffer unit 115 as the result of this determination, 10 is added to the priority flag thereof in S703. On the other hand, if the RAW image data is not in the buffer unit 115 as the result of the determination in S702, the routine proceeds to S704.

Subsequently in S704, the metadata portion of the RAW image data to be a target of follow-up development is checked and whether any data whose photographing type information is continuous shoot photographing or bracketing photographing exists is determined. If RAW image data whose photographing type information is continuous shoot photographing or bracketing photographing exists as the result of this determination, 01 is added to the priority flag thereof in S705. On the other hand, if the photographing type information is not continuous shoot photographing or bracketing photographing as the result of the determination in S704, the routine proceeds to S706.

Subsequently in S706, whether RAW image data whose priority flag is 11 (S702/YES and S704/YES) exists is determined. If RAW image data whose priority flag is 11 exists as the result of this determination, from among these, the RAW image data of the representative image described above is selected from the image group which is in the buffer unit 115, which is continuous shoot photographing or bracketing photographing, and whose photographing time is newest in S707. On the other hand, if RAW image data whose priority flag is 11 does not exist as the result of the determination in S706, the routine proceeds to S708.

Next, in S708, whether RAW image data whose priority flag is 10 (S702/YES and S704/NO) exists is determined. If RAW image data whose priority flag is 10 exists as the result of this determination, from among these, the RAW image data which is in the buffer unit 115, and whose photographing time is newest is selected in S709. On the other hand, if RAW image data whose priority flag is 10 does not exist as the result of the determination in S708, the routine proceeds to S710.

Next, in S710, whether RAW image data whose priority flag is 01 (S702/NO and S704/YES) exists is determined. If RAW image data whose priority flag is 01 exists as the result of this determination, from among these, the RAW image data which is continuous shoot photographing or bracketing photographing, and whose photographing time is newest is selected in S711. On the other hand, if RAW image data whose priority flag is 01 does not exist as the result of the determination in S710, then the priority flag is 00 and the RAW image data whose photographing time is newest is selected in S712.

Figure 8:
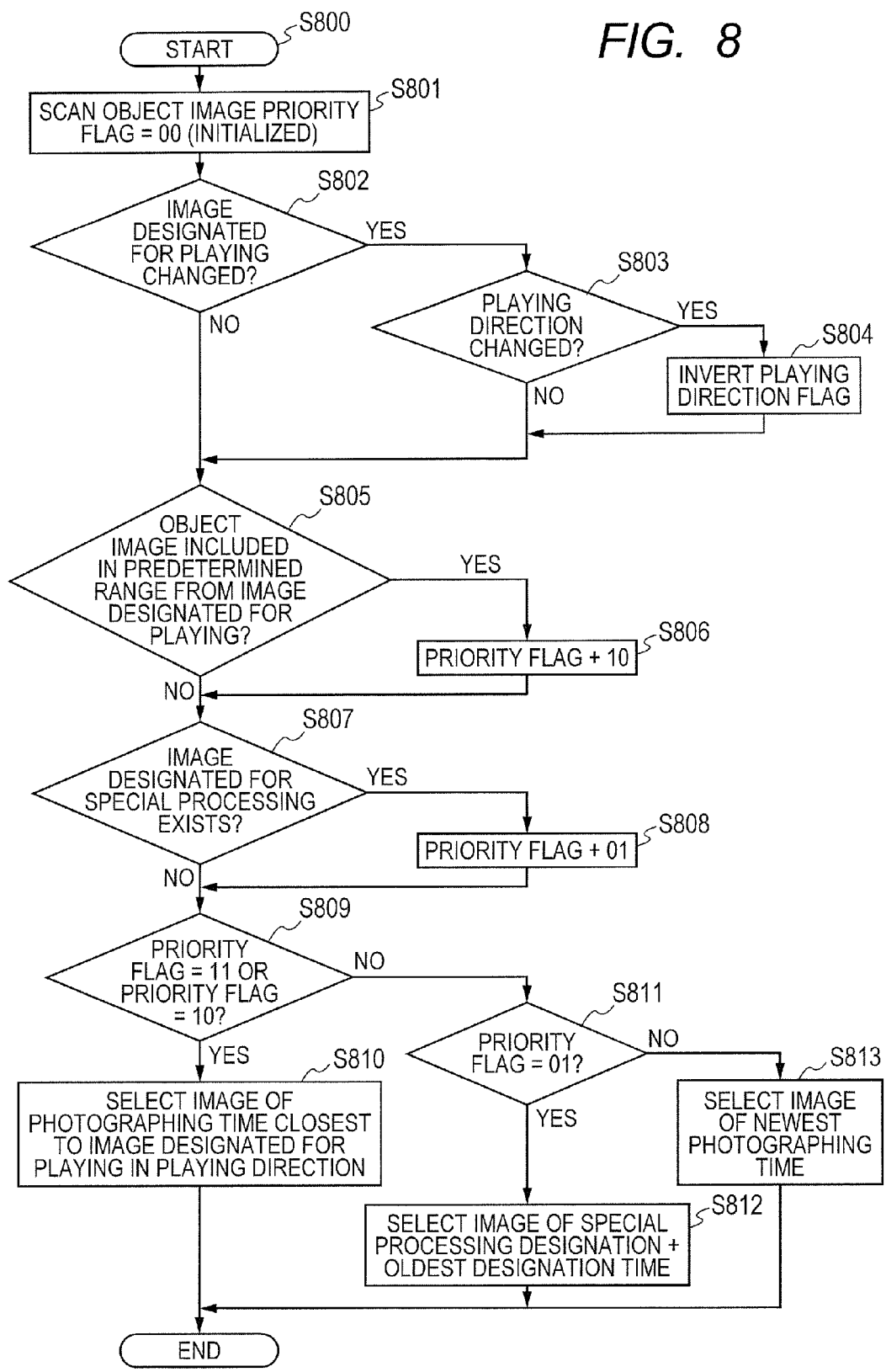
FIG. 8 is a flowchart illustrating an example of a processing procedure for selecting the RAW image data to be a target of the follow-up development during playing.

FIG. 8 is a flowchart illustrating an example of a processing procedure in which the developed image selecting unit 171 selects RAW image data to be a target of follow-up development during playing. When image data is selected to perform follow-up development during playing, processing is performed with the objective of providing high quality display images in a timely manner when an operation of the user designates image data to be played.

In this processing, the parameter of first priority is that image data exists which is within a predetermined number of images whose photographing time is continuous in the playing direction from the image data designated to be played by an operation of the user ("image designated for playing" hereinafter). The playing direction here means the temporal direction of the next image to be designated to be played implied by the operation of the user with respect to the image designated for playing. In this embodiment, whether the temporal direction is back in time or forward in time with respect to the image designated for playing is determined according to the image-sending operation of the user during playing.

Here, if the user has not designated an image to be played, the image data whose photographing time is newest is selected as the image designated for playing, and if a playing direction has also not been designated by the user, the playing direction of back in time with respect to the photographing time is selected. Note that the parameter of first priority here may be that image data that was taken within a predetermined period of time of the image designated for playing and which has not been developed exists, rather than that image data exists which is within a predetermined number of images of the image designated for playing. Also, making whether to use a predetermined number of images or a predetermined period of time settable by the user, or making the controlling unit 161 automatically make the setting according to the performance of the high image quality development unit 112 or the situation of the imaging apparatus 100 are possible as well. Thereby, even when the user performs an image-sending operation to change the image designated for playing, high quality display images can be provided in a timely manner.

Also, the user may check the display image and instruct the apparatus to transfer the image to an external device for purposes such as printing out the image or posting it to an SNS in some cases. For such cases, that image data exists for which this sort of special processing other than displaying has been designated is made the parameter of second priority. Thereby, special processing can be performed without hindering the user's work of checking the playing.

First, upon starting the process in S800 of FIG. 8, in S801 the developed image selecting unit 171 extracts candidate pieces of RAW image data to be a target of follow-up development and scans the statuses thereof, as well as initializing priority flags used for internal processing to 0. Next, in S802, whether or not new image data has been designated to be played by an operation of the user is determined. If new image data has not been designated to be played as the result of this determination, the routine proceeds to S805, and if new image data has been designated to be played, the routine proceeds to S803. In S803, whether or not the playing direction has been changed by an operation of the user is determined. If the playing direction has been changed as the result of this determination, a playing direction flag is inverted in S804. On the other hand, if the playing direction has not been changed as the result of this determination, the routine proceeds to S805.

Subsequently in S805, whether or not any RAW image data to be a target of follow-up development exists within a predetermined number of images whose photographing time is continuous in the playing direction from the image data designated to be played is determined. If such RAW image data exists within the predetermined number of images whose photographing time is continuous, 10 is added to the priority flag thereof in S806. On the other hand, if such RAW image data does not exist within the predetermined number of images whose photographing time is continuous as the result of the determination in S805, the routine proceeds to S807.

Subsequently in S807, whether or not any image data for which special processing such as printing out or transfer to an external device has been designated exists within the target of follow-up development is determined. If image data for which special processing has been designated exists as the result of this determination, 01 is added to the priority flag of such RAW image data in S808. On the other hand, if image data for which special processing has been designated does not exist as the result of the determination in S807, the routine proceeds to S809.

Subsequently in S809, whether RAW image data whose priority flag is 11 (S805/YES and S807/YES) or 10 (S805/YES and S807/NO) exists is determined. If RAW image data whose priority flag is 11 or 10 exists as the result of this determination, from among these, the RAW image data temporally closest to the image data designated to be played in the playing direction is selected in S810. On the other hand, if RAW image data whose priority flag is 11 or 10 does not exist as the result of the determination in S809, the routine proceeds to S811.

Subsequently in S811, whether RAW image data whose priority flag is 01 (S805/NO and S807/YES) exists is determined. If RAW image data whose priority flag is 01 exists as the result of this determination, from among these, the RAW image data for which special processing has been designated and whose time at which the special processing was designated is oldest is selected in S812. On the other hand, if RAW image data whose priority flag is 01 does not exist as the result of the determination in S811, then the priority flag of all candidates is 00 and the RAW image data whose photographing time is newest is selected in S813.

Figure 9:
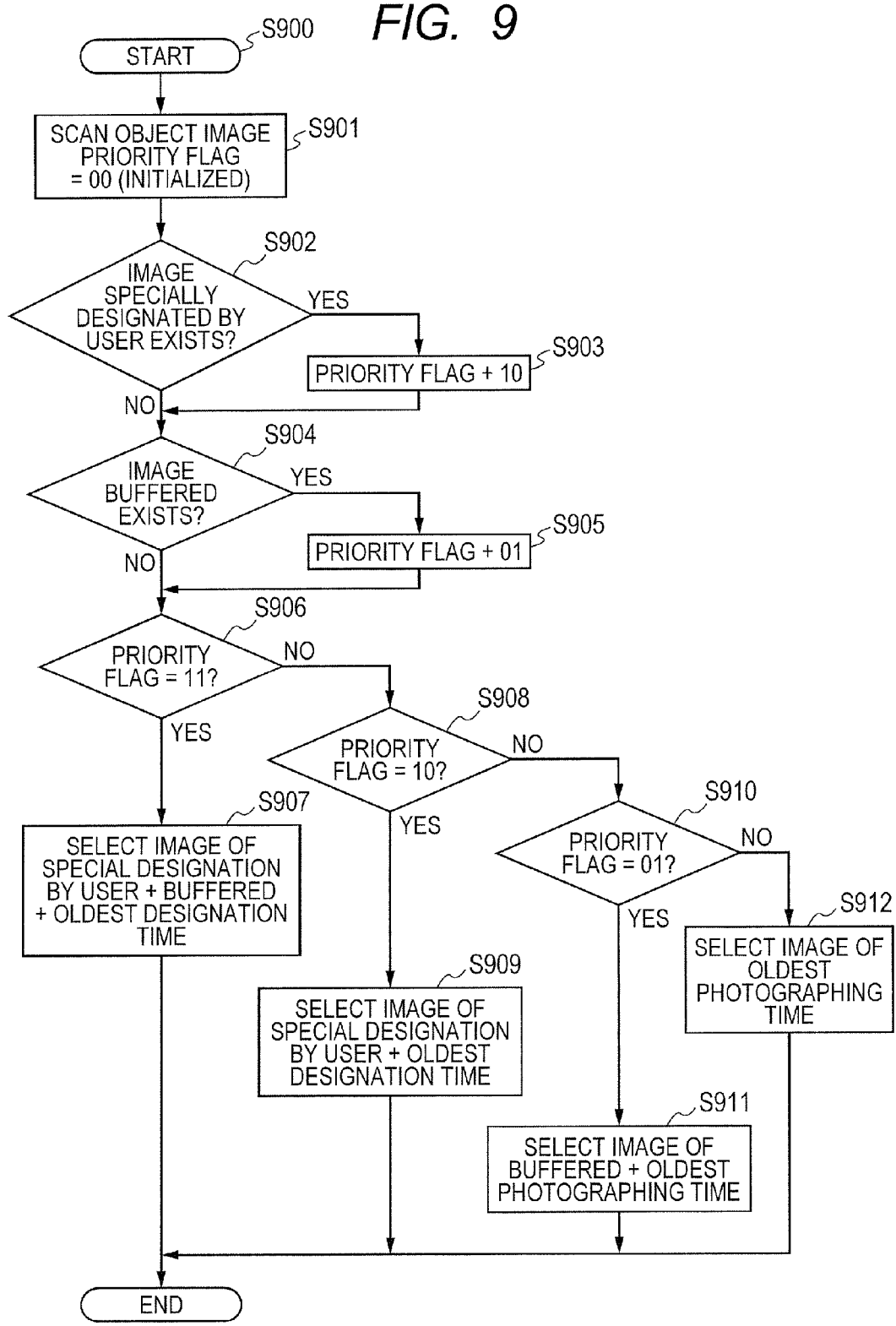
FIG. 9 is a flowchart illustrating an example of a processing procedure for selecting the RAW image data to be a target of the follow-up development during idle.

FIG. 9 is a flowchart illustrating an example of a processing procedure in which the developed image selecting unit 171 selects RAW image data to be a target of follow-up development during idle. When image data is selected to perform follow-up development during idle, processing is performed with the objective of performing special processing such as printing out or transfer to an external device.

In this processing, the parameter of first priority is that image data exists for which special processing has been designated. The parameter of second priority is that the targeted image data is in the buffer unit 115. Thereby, the processing designated by the user can be carried out efficiently.

In S900 of FIG. 9, upon starting the process, in S901, the developed image selecting unit 171 extracts candidate pieces of RAW image data to be a target of follow-up development and scans the statuses thereof, as well as initializing priority flags used for internal processing to 0. Next, in S902, whether or not RAW image data exists for which special processing such as printing out or transfer to an external device has been designated is determined. If RAW image data exists for which special processing has been designated exists as the result of this determination, 10 is added to the priority flag of such RAW image data in S903. On the other hand, if RAW image data for which special processing has been designated does not exist as the result of the determination in S902, the routine proceeds to S904.

Next, in S904, whether or not the candidate pieces of RAW image data to be a target of follow-up development are in the buffer unit 115 is determined. If the RAW image data is in the buffer unit 115 as the result of this determination, 01 is added to the priority flag thereof in S905. On the other hand, if the RAW image data is not in the buffer unit 115 as the result of the determination in S904, the routine proceeds to S906.

Subsequently in S906, whether RAW image data whose priority flag is 11 (S902/YES and S904/YES) exists is determined. If RAW image data whose priority flag is 11 exists as the result of this determination, from among these, the RAW image data which is in the buffer unit 115, for which special processing has been designated, and whose time at which the designation was made is oldest is selected in S907. On the other hand, if RAW image data whose priority flag is 11 does not exist as the result of the determination in S906, the routine proceeds to S908.

Subsequently in S908, whether RAW image data whose priority flag is 10 (S902/YES and S904/NO) exists is determined. If RAW image data whose priority flag is 10 exists as the result of this determination, from among these, the RAW image data for which special processing has been designated, and whose time at which the designation was made is oldest is selected in S909. On the other hand, if RAW image data whose priority flag is 10 does not exist as the result of the determination in S908, the routine proceeds to S910.

Subsequently in S910, whether RAW image data whose priority flag is 01 (S902/NO and S904/YES) exists is determined. If RAW image data whose priority flag is 01 exists as the result of this determination, from among these, the RAW image data which is in the buffer unit 115, and whose photographing time is oldest is selected in S911. On the other hand, if RAW image data whose priority flag is 01 does not exist as the result of the determination in S910, then the priority flag of all candidates is 00 and the RAW image data whose photographing time is oldest is selected in S912.

RAW image data to be a target of follow-up development is selected according to any of the procedures in FIGS. 7 to 9 above. Then, upon selecting the RAW image data to be a target of follow-up development according to any of the aforementioned procedures, the routine transitions to S619.

Returning to the description of FIG. 6, next, in S619, the controlling unit 161 determines whether or not the selected RAW image data (RAW file) is in the buffer unit 115. If the RAW image data is in the buffer unit 115 as the result of this determination, the routine proceeds to S621. If the RAW image data is not in the buffer unit 115, the corresponding RAW file is read out from the recording medium 152 by the recording and playing unit 151 in S620.

Here, in the buffer unit 115, image data is updated so that new image data photographed in the still image photographing mode is held with priority. That is, image data is erased from the buffer unit 115 in order from image data photographed in the past. Because of this, image data that has just been photographed is always held in the buffer unit 115, so the processing in S620 can be skipped and processing can be performed at high speed. Furthermore, by executing follow-up development in the order of backwards in time from the time of the image data that has just been photographed, processing of image data that is held in the buffer unit 115 can be completed with priority, which can improve the efficiency of processing.

Subsequently in S621, the RAW extending unit 114 performs extension processing on the RAW file read out from the buffer unit 115 or the recording medium 152 to restore the RAW image data. Then, in S622, the high image quality development unit 112 performs high image quality development processing on the restored RAW image data and outputs the processed image data to the still image compressing unit 141 via the switch unit 121.

In the development processing performed by the high image quality development unit 112, the RAW image data is subjected to de-Bayer processing (de-mosaic processing), converted to signals made of brightness and color differences, noise included in each signal is eliminated, and processing to correct optical strain, make the image proper, and the like is performed. The size (number of pixels) of the image data subjected to development processing by the high image quality development unit 112 may be the full size read out from the image sensor unit 102, or may be a preset size. Accordingly, the image quality of the processed image data is markedly higher than that of the image data subjected to rough development processing which is limited to 2 million pixels or less.

Because the high image quality development unit 112 executes each process with higher accuracy than the rough development unit 111, higher quality image data can be acquired, but the processing load is larger by a corresponding amount. In the high image quality development unit 112 of this embodiment, it is possible to avoid performing development processing in real time in parallel with photographing, and to take time to perform development processing, and hence increases in the circuit scale and power consumption can be suppressed.

Subsequently in S623, the still image compressing unit 141 performs a high-efficiency encoding process (still image compression) on the image data subjected to development processing by the high image quality development unit 112 to generate a high image quality still image file. Note that the still image compressing unit 141 performs compression processing according to a known technology such as JPEG. Then, in S624, the recording and playing unit 151 records the high image quality still image file in the recording medium 152 or the like and the routine transitions to s602. Note that when still image data exists which has not been subjected to follow-up development processing, the same follow-up development processing may be repeatedly executed for each image.

The still image file recorded in S624 has the same configuration as the still image file 500 illustrated in FIG. 5A, and includes a header portion 501, a metadata portion 502, and a compressed data portion 503. Note that the metadata portion 502 includes information 504 of a file name of the RAW file generated based on this still image file 500. In addition, the development status information 505 indicating that this still image file 500 has been subjected to high image quality development by the high image quality development unit 112 is included. Furthermore, the photographed metadata 506 described above is included.

When the recording and playing unit 151 records the high image quality still image file in S624, the same file name as the still image file subjected to rough development is given, and the recording overwrites this still image file. That is, the still image file subjected to rough development is deleted. Then, the recording and playing unit 151 updates the development status information 515 in the metadata portion 512 in the RAW file on which the follow-up development is based to information indicating that high image quality development is completed (or that follow-up development is completed).

Figure 10:
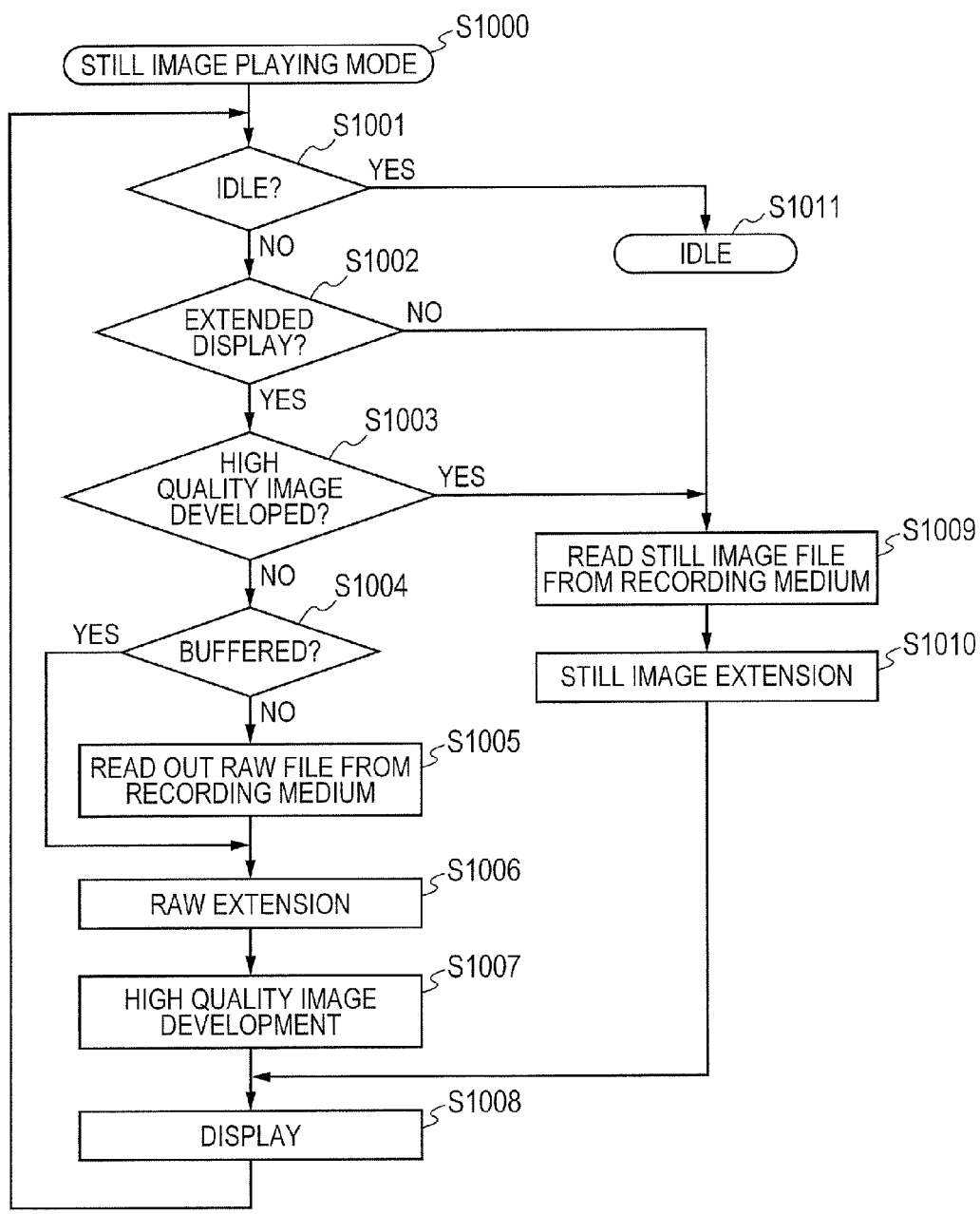
FIG. 10 illustrates a flowchart illustrating an example of a processing procedure in a still image playing mode of the embodiment of the present invention.

Next, operation in the still image playing mode of the imaging apparatus 100 is described. FIG. 10 is a flowchart illustrating an example of a processing procedure in the still image playing mode of this embodiment. The flowchart illustrated in FIG. 10 illustrates a processing procedure executed by controlling each processing block by the controlling unit 161. It is realized when a program stored in a memory (ROM) in the controlling unit 161 is expanded to a memory (RAM) and is executed by the CPU.

When processing of the still image playing mode is started at S1000 in FIG. 10, at S1001, the controlling unit 161 determines whether a processing load of the imaging apparatus 100 is low and transition should be made to the idle state or not. At this time, in the same way as in the still image photographing mode, it is assumed that if the processing load is low, transition to the idle state is made at a frequency according to the load situation. As the result of this determination, if transition should be made to the idle state, transition is made to the idle state (S1011), while if not, the routine proceeds to S1002. Note that the processing in the case of transition to the idle state is the same as in FIG. 6, and thus description thereof is omitted here.

For example, while waiting for an operation by the user such as a play instruction, the processing load is low, and thus transition is made to S1011 at a high frequency. On the other hand, when playing of still image data begins according to the operation of the user (including during playing status), for example, the processing load is high, and thus the routine proceeds to S1002.

Subsequently in S1002, the controlling unit 161 determines whether or not to perform extended display for still image data to be displayed. As the result of this determination, if extended display is to be performed, the routine proceeds to S1003, and if extended display is not to be performed, the routine proceeds to S1009. Here, cases when extended display is to be performed include cases where an extended display instruction is received according to an operation of the user, and cases where the image quality deteriorates if normal display is performed, as described later.

Figure 11A:
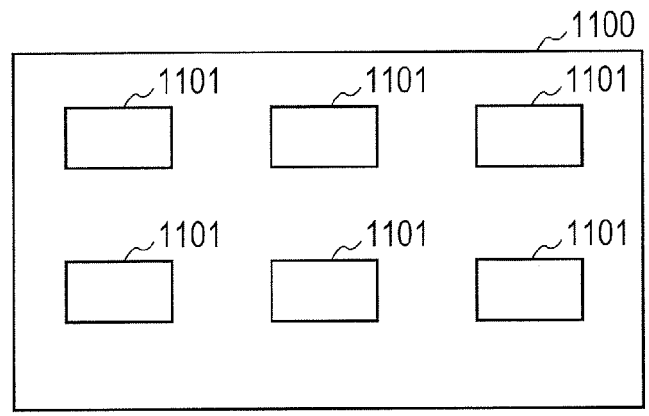
FIGS. 11A, 11B and 11C are diagrams illustrating a display example of an image in the still image playing mode.
Figure 11B:
Figure 11C:
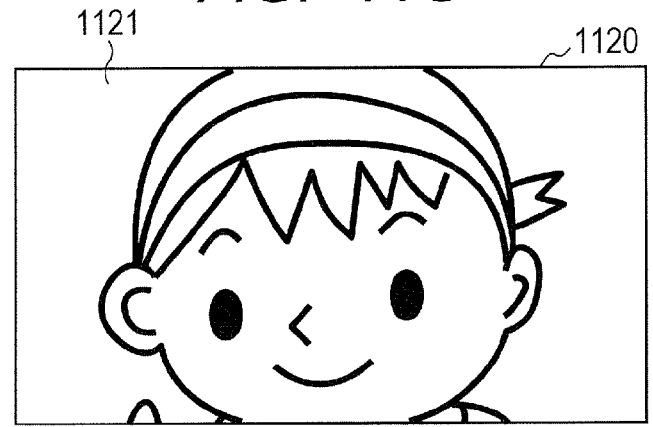

FIGS. 11A, 11B and 11C are diagrams illustrating types of display forms including extended display, and illustrates display examples of in the still image playing mode of this embodiment. FIG. 11A illustrates an example of a screen 1100 displaying six reduced-size images 1101 on the display unit 123. FIG. 11B illustrates an example of a screen 1110 displaying the whole of one certain image 1111 on the display unit 123; this display status is referred to as normal display herein. FIG. 11C illustrates an example of a screen 1120 displaying an enlarged partial area of one certain image 1121 on the display unit 123. For example, to check whether an image is in proper focus immediately after photographing, the user generally uses extended display to check details of the subject image.

Here, when reduced display is performed as in the screen 1100 illustrated in FIG. 11A, the routine transitions from S1002 to S1009. When normal display is performed as in the screen 1110 illustrated in FIG. 11B, the following processing is carried out. If the number of display pixels of the display unit 123 is equal to or less than the number of pixels of the still image file subjected to rough processing (2 million pixels, for example), the same size or reduced size image is displayed, and thus the routine transitions from S1002 to S1009.

In S1009, the recording and playing unit 151 reads out a still image file to be played from the recording medium 152 or the like. Then, in S1010, the still image extending unit 143 decodes and extends the still image file and, in S1008 described later, the display processing unit 122 displays the still image on the display unit 123 in a display form illustrated in FIG. 11C.

If the displayed image has the number of pixels of the still image file subjected to rough development or less, it can be displayed in adequate image quality even if the still image file has been subjected to development processing by the rough development unit 111. On the other hand, if extended display is performed, the displayed image may have more pixels than the number of pixels of the still image file subjected to rough development. That is, displaying the still image subjected to rough development may result in a sense of poor resolution.

Therefore, if extended display is to be performed as the result of the determination in S1002, the controlling unit 161 determines whether or not the still image file of the image to be displayed has been subjected to development by the high image quality development unit 112 in S1003. As the determination method, the controlling unit 161 refers to the development status information 505 stored in the metadata portion 502 of the still image file 500 as illustrated in FIG. 5A. Note that the determination may also be made in a similar manner by referring to the development status information 515 in the RAW file 510. Alternatively, the determination can be made by preparing a separate table file indicating the development processing statuses for a series of photographed still images, and referring to this table.

If the still image file has been subjected to high image quality development as the result of the determination in S1003, the image can be displayed in adequate image quality even in extended display, so the routine proceeds to S1009. On the other hand, if the still image file has not been subjected to high image quality development as the result of the determination in S1003, the still image file is one which has been subjected to development processing by the rough development unit 111. In such cases, in the processing from S1004 onward, high image quality development is performed on the RAW file corresponding to the image to be displayed in the same manner as the follow-up development described above.

The processes in S1004 to S1007 are respectively similar to the processes in S619 to S622 in FIG. 6, and therefore description thereof is omitted here. Upon performing high image quality development processing in S622, the processed still image data is output to the display processing unit 122 via the switch unit 121. The, in S1008, the display processing unit 122 displays the image on the display unit 123 in the display form illustrated in FIG. 11C. Note that if display is stopped in S1008, the routine returns to S1001.

Here, it is assumed that the high image quality development performed in S1004 onward in FIG. 10 occurs at a timing when follow-up development has not yet been performed, such as immediately after photographing. In this embodiment, follow-up development of still image data is executed in a state in which the processing load is relatively small, such as between taking photographs. Accordingly, with the passage of time, most still image files subjected to rough development are replaced with still image files subjected to high image quality development by repeating the processes illustrated in FIG. 6. As this replacement of still image files progresses, the number of cases of performing the processing in S1004 onward is reduced, and high image quality images can be quickly output for extended display, which increases the operability.

As previously described, when a RAW file is held in the buffer unit 115, S1005 can be skipped, and images can be displayed rapidly. Therefore, when display is performed as illustrated in FIG. 11A or FIG. 11B, the processing in preparation for extended display may be performed so that the RAW file is in the state of being held in the buffer unit 115 as much as possible. Specifically, the RAW file(s) corresponding to the image(s) displayed in the display states illustrated in FIG. 11A or FIG. 11B may be preliminarily read out from the recording medium 152 to be held in the buffer unit 115 in advance. In this way, when an instruction for extended display is given, the image(s) can be displayed more quickly by the recording and playing unit 151 reading out the relevant RAW file(s) from the recording medium 152 and buffering them before an instruction for extended display is given.

Figure 12:
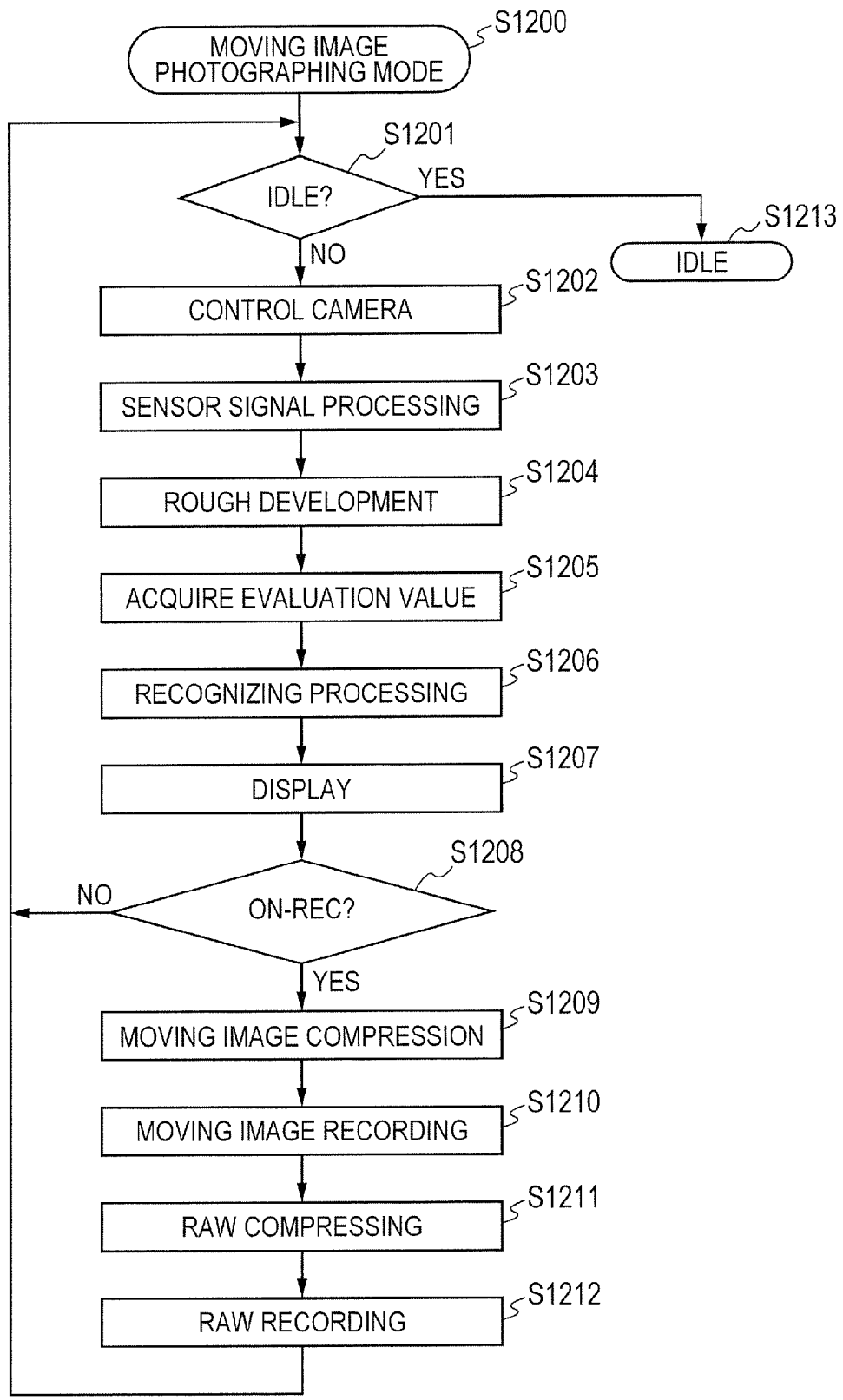
FIG. 12 illustrates a flowchart illustrating an example of a processing procedure in a moving image photographing mode of the embodiment of the present invention.

Next, operation in the moving image photographing mode of the imaging apparatus 100 is described. FIG. 12 is a flowchart illustrating an example of a processing procedure in the moving image photographing mode of this embodiment. The flowchart illustrated in FIG. 12 illustrates a processing procedure executed by controlling each processing block by the controlling unit 161. It is realized when a program stored in a memory (ROM) in the controlling unit 161 is expanded to a memory (RAM) and is executed by the CPU.

When processing of the moving image photographing mode is started at S1200 in FIG. 12, at S1201, the controlling unit 161 determines whether a processing load of the imaging apparatus 100 is low and transition should be made to the idle state or not. At this time, in the same way as in the still image photographing mode, it is assumed that if the processing load is low, transition to the idle state is made at a frequency according to the load situation. As the result of this determination, if transition should be made to the idle state, transition is made to the idle state (S1213), while if not, the routine proceeds to S1202. Note that the basic processing procedure in the case of transition to the idle state is similar to that in FIG. 6, although the RAW file to be processed is a moving image file, and thus description thereof is omitted here.

In cases when, for example, shooting of a moving image having many pixels such as a horizontal resolution equivalent to 4000 pixels (4K) or a moving image having a high frame rate such as 120 fps (120 P) is set, the processing load is high, and thus the routine always proceeds to S1202 without transitioning to S1213. On the other hand, if shooting of a moving image having fewer than a certain number of pixels or shooting of a moving image having a frame rate slower than a certain speed is set, transition is made to S1213 between processing of a first frame and processing of a second frame of the moving image at a half frequency, for example.

Next, the processes in S1202 to S1207 are respectively similar to the processes in S402 to S407 in FIG. 4, and therefore description thereof is omitted here. Rough development processing is performed for the RAW image data included in each frame of the moving image. By the procedures similar to the above, images are displayed so that the user can appropriately frame the subject in the moving image photographing mode. Specifically, as a usage form particular to moving image photography, live view display for appropriately framing the subject is performed not only before the start of recording of the photographed moving image (during standby), but also during recording of the moving image (during REC).

Next, in S1208, the controlling unit 161 determines whether or not a recording start instruction of a moving image by an operation of the user has been received and recording of the photographed moving image is in progress (during REC). As the result of this determination, if recording of a moving image is in progress, the routine proceeds to S1210. On the other hand, if recording of a moving image is not in progress as the result of the determination in S1208 (that is, during standby), the routine returns to S1201 and photographing operation before the start of recording of the moving image and live view display are repeated.

Next, in S1209, the moving image compressing unit 142 compresses the moving images to be recorded from the start of recording to the end of recording on a frame-by-frame basis, from among photographed moving images. Note that although the configuration is omitted in FIG. 1, simultaneously with photographing of the moving image, audio data input by an un-illustrated microphone is also acquired. The moving image compressing unit 142 also performs compression processing of the audio data corresponding to the moving image. The moving image compressing unit 142 performs a high-efficiency encoding process (moving image compression) on the acquired moving image data and audio data subjected to rough development, and generates a moving image file. Note that the moving image compressing unit 142 performs compression processing using a known moving image compressing technology such as MPEG-2, H.264, H.265, or the like. Then, in S1210, the recording and playing unit 151 records the moving image file in the recording medium 152.

Further, in S1211, the RAW compressing unit 113 acquires RAW image data of a period corresponding to the moving image to be recorded from the sensor signal processing unit 103. Then, in S1212, the RAW compressing unit 113 subjects the RAW image data showing the same scene as the moving image to be recorded to high efficiency encoding (RAW compression) and converts it to a RAW file. Then, the RAW file is stored in the buffer unit 115. The RAW file is the same thing as previously described. In addition, the recording and playing unit 151 transitions to S1201 after recording the RAW file in the recording medium 152.

Figure 13A:
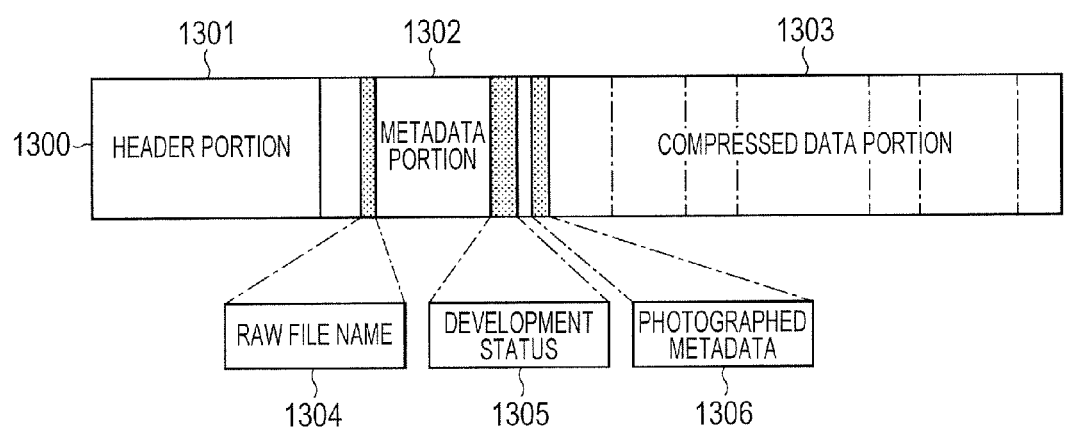
FIGS. 13A and 13B are diagrams illustrating a configuration example of a moving image file and its RAW file.
Figure 13B:
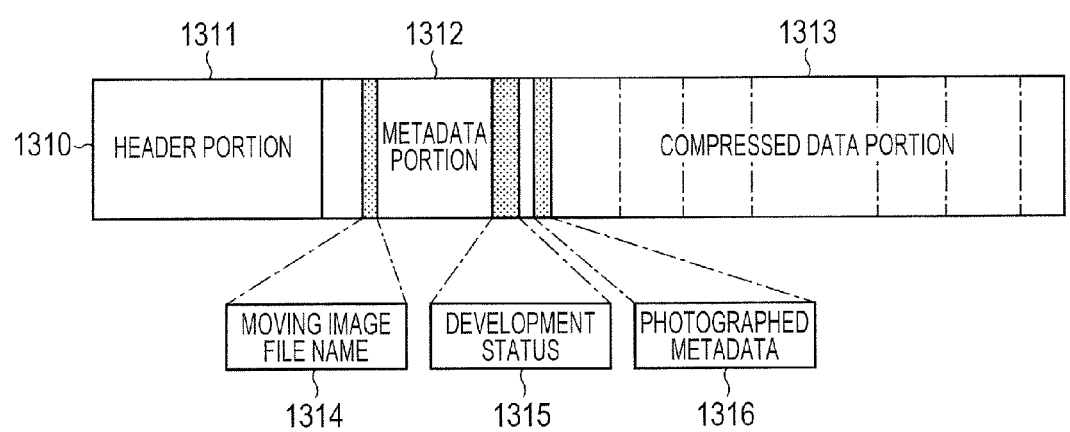

Here, the structure of the moving image file, and the structure of the RAW file corresponding to the moving image file according to this embodiment are described. FIGS. 13A and 13B are diagrams illustrating a configuration example of the moving image file and the RAW file. A moving image file 1300 illustrated in FIG. 13A includes a header portion 1301, a metadata portion 1302, and a compressed data portion 1303, similarly to the still image file 500 illustrated in FIG. 5A. The header portion 1301 includes an identification code indicating that the file is in a moving image file format and the like. The compressed data portion 1303 includes high efficiency encoded moving image data and compressed audio data. The metadata portion 1302 includes information 1304 of a file name of the RAW file, development status information 1305, and photographed metadata 1306, similarly to the metadata portion 502 of the still image file 500 illustrated in FIG. 5A.

The RAW file 1310 corresponding to a moving image file illustrated in FIG. 13B includes a header portion 1311, a metadata portion 1312, and a compressed data portion 1313, similarly to the RAW file illustrated in FIG. 5B. The header portion 1311 includes an identification code indicating that the file is in a RAW file format. The compressed data portion 1313 includes RAW compressed data of the high efficiency encoded moving image. Note that RAW image data of a moving image which has not been compressed may be included in the compressed data portion 1313.

The metadata portion 1312 includes information 1314 of a file name of the moving image file 1300, development status information 1315, and photographed metadata 1316, similarly to the metadata portion 512 of the RAW file 510 illustrated in FIG. 5B. Note that the entire moving image file itself generated at the same time, or an extracted portion thereof such as the first frame may be made into metadata and stored in the metadata portion 1312. Also, the structures of the various files of the moving image according to this embodiment are only examples and the configurations may conform to standards such as DCF, AVCHD, and MXF.

The imaging apparatus 100 according to this embodiment can realize rough development processing of a moving image of, for example, HD size with a small circuit scale and low power consumption, similarly to the case of the still image photographing mode. Also, the RAW file can be recorded by a small-scale circuit with low power consumption.

Next, operation in the moving image playing mode of the imaging apparatus 100 is described. FIG. 14 is a flowchart illustrating an example of a processing procedure in the moving image playing mode of this embodiment. The flowchart illustrated in FIG. 10 illustrates a processing procedure executed by controlling each processing block by the controlling unit 161. It is realized when a program stored in a memory (ROM) in the controlling unit 161 is expanded to a memory (RAM) and is executed by the CPU.

When processing of the moving image playing mode is started at S1400 in FIG. 14, at S1401, the controlling unit 161 determines whether a processing load of the imaging apparatus 100 is low and transition should be made to the idle state or not. At this time, in the same way as in the still image photographing mode, it is assumed that if the processing load is low, transition to the idle state is made at a frequency according to the load situation. As the result of this determination, if transition should be made to the idle state, transition is made to the idle state (S1414), while if not, the routine proceeds to S1402. Note that the basic processing procedure in the case of transition to the idle state is similar to that in FIG. 6, although the RAW file to be processed is a moving image file, and thus description thereof is omitted here.

For example, while waiting for an operation by the user such as a play instruction, the processing load is low, and thus transition is made to S1412 at a high frequency. On the other hand, when playing of moving image data begins according to the operation of the user (including during playing status), for example, the processing load is high, and thus the routine proceeds to S1402.

Next, in S1402, the controlling unit 161 determines whether an instruction to pause the playing of the moving image data being played has been received by an operation of the user. As the result of this determination, if an instruction to pause has not been received, the playing of the moving image data continues, and thus the routine proceeds to S1403.

Next, in S1403, the recording and playing unit 151 reads out a moving image file to be played from the recording medium 152 or the like. Then, in S1404, the moving image extending unit 144 decodes and extends the moving image file one frame at a time. Then, in S1405, the display processing unit 122 displays the moving image played on the display unit 123.

On the other hand, if an instruction to pause has been received as the result of the determination in S1402, the routine transitions to S1406 to display, as a still image, the frame at the stop position at which the playing was paused. Here, in the pause state, because the image is displayed still, it is easier to visually recognize the image quality of the details than when the image is moving. Further, during pause, it is thought that the likelihood of receiving an extended display instruction is higher than during playing. Therefore, in this embodiment, an image of higher image quality than that of a moving image file subjected to rough development is displayed during pause.

First, in S1406, the controlling unit 161 determines whether or not a moving image file of the scene to be paused which has been subjected to follow-up development and high image quality development and the like has already been recorded in the recording medium 152 or the like. If a high image quality moving image file has already been recorded as the result of this determination, in S1407, the recording and playing unit 151 reads out the high image quality moving image file to be played from the recording medium 152 or the like. Then, that frame is displayed.

On the other hand, if a high image quality moving image file does not exist as the result of the determination in S1406, in S1408 the recording and playing unit 151 reads out the RAW file corresponding to the moving image file being played. At this time, if the RAW file to be played is held in the buffer unit 115, the RAW file is read out from the buffer unit 115, and if not, the RAW file is read out from the recording medium 152 or the like.

Next, in S1409, the RAW extending unit 114 decodes and extends the RAW file read out from the buffer unit 115 or the recording medium 152 or the like to restore the RAW image data. Then, in S1410, the high image quality development unit 112 performs high image quality development processing on the paused frame of the restored RAW image data.

The imaging apparatus 100 according to this embodiment can also capture a high image quality still image corresponding to a frame being displayed during pause from the RAW file of the moving image as a new still image file in this manner. Subsequently in S1411, the controlling unit 161 determines whether or not an instruction by an operation of the user to capture the displayed image at the stop position as a still image has been received. If an instruction to capture has not been received as the result of this determination, in S1405, the display processing unit 122 displays the still image paused which has been subjected to high image quality development on the display unit 123. By this process, the image of the moving image file being displayed during pause is replaced with a still image which has been subjected to high image quality development.

On the other hand, if an instruction of capturing has been received as the result of the determination in S1411, the routine proceeds to S1412. Then, in S1412, the still image compressing unit 141 acquires the image data subjected to development processing by the high image quality development unit 112. Then, the still image compressing unit 141 performs a high-efficiency encoding process (still image compression) on the image data acquired by capturing to generate a high image quality still image file. Note that the still image compressing unit 141 performs compression processing according to a known technology such as JPEG.

Next, in S1413, the recording and playing unit 151 records the high image quality still image file acquired in S1412 in the recording medium 152 or the like. Then the routine transitions to S1405 and the display processing unit 122 displays the still image being paused which has been subjected to high image quality development on the display unit 123 as described above.

Here, the high image quality still image file generated by the still image compressing unit 141 in S1412 has a similar configuration to the still image file 500 illustrated in FIG. 5A. However, the information 504 of the file name of the RAW file stored in the metadata portion 502 is the file name of the RAW file of the moving image on which the capture was based. In addition, as the photographed metadata 506, time instant information of the frame captured as the still image is stored, which can indicate the corresponding frame position in the RAW file of the moving image.

At this time, a new RAW file 510 to be paired with the new still image file can be generated by extracting the corresponding frame from the RAW file of the moving image as a still image. The procedure for generating the RAW file of the still image is similar to the processing procedure in S409 to S412 of the still image photographing mode described earlier, by which a still image file and a RAW file are generated.

Note that the display in S1405 is performed on a frame-by-frame basis, and during playing of a moving image, the routine returns to S1401 to display the next frame. In this way, the imaging apparatus 100 according to this embodiment can use a moving image file recorded at the time of photographing to easily play the moving image file without delay, and can replace the moving image with a still image subjected to high image quality development from a RAW file and display the still image in the pause state. Furthermore, this high image quality still image can also be easily captured as a still image file.

It is assumed that the high image quality development process performed in S1408 onward of FIG. 14 may occur at timing immediately after photographing when follow-up development has not yet been performed. In this embodiment, this sort of follow-up development of moving images is gradually completed at times when the apparatus is in a state in which the apparatus is waiting for an operation by the user and the processing load is relatively small, such as between taking photographs or while the apparatus is in a playing mode or a sleep state, and moving image files subjected to rough development are naturally replaced with moving image files subjected to high image quality development. As the replacement proceeds this way, the number of cases in which the high image quality development in S1406 onward occurs is reduced, and it becomes possible to always proceed to S1407 and quickly output high image quality images, which increases the operability.

In this way, the imaging apparatus 100 according to this embodiment executes follow-up development in a state in which the apparatus is waiting for an operation by the user and the processing load is relatively small, such as between taking photographs or while the apparatus is in a playing mode or a sleep state. Then, still image files subjected to rough development at the time of photographing are replaced with still image files subjected to high image quality development using the RAW files. Moving image files subjected to rough development at the time of photographing are also replaced with moving image files subjected to high image quality development using the RAW files. Thereby, excessive development processing on each occasion can be made unnecessary even when high quality images are demanded such as for checking details of the images or printing out the images. Furthermore, the files can also be used in an ordinary environment in the same manner as conventional still image files.

The present embodiment has been described above. However, the present invention is not limited to the embodiment described above and should be applied by making changes as appropriate, within the technical concepts described herein, according to the form of the circuit to which it is applied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-267249, filed Dec. 25, 2013, which is hereby incorporated by reference herein in its entirety.

The invention claimed is:

1. An imaging apparatus comprising:
one or more processors or circuits which function as
an imaging unit;
a recording unit configured to record, in a recording medium, RAW image data generated by the imaging unit without development processing;
a first development unit configured to subject the RAW image data recorded in the recording medium to the development processing, to generate a first developed image;
a determining unit configured to determine an operation mode of the imaging apparatus; and
a setting unit configured to set a priority in an order of the developments of a plurality of RAW images recorded in the recording medium, according to kinds of the operation modes of the imaging apparatus determined by the determining unit, such that, when the plurality of RAW images recorded in the recording medium include a RAW image to be subjected to a special processing of print out or of transferring to an external apparatus, the RAW image to be subjected to the special processing is preferentially subjected to the development.

2. The imaging apparatus according to claim 1, further comprising
a second development unit configured to subject the RAW image data generated by the imaging unit to a rough development processing, to generate a second developed image, wherein,
when, after generating the second developed image, the first developed image is generated, the second developed image is replaced with the first developed image.

3. The imaging apparatus according to claim 1,
wherein a file of the RAW image data recorded in the recording unit contains information indicating as to whether the RAW image data is subjected to the development.

4. The imaging apparatus according to claim 1, wherein, when the determining unit determines the operation mode of the imaging apparatus as being a playing mode, the first development unit configured to subject, to the development processing, an image of a photographing time closest to a playing direction among images on playing.

5. The imaging apparatus according to claim 1, wherein, when the recording medium has a buffer containing the RAW image data recorded therein, the RAW image data recorded in the buffer is preferentially subjected to the development.

6. The imaging apparatus according to claim 1, wherein, when the plurality of RAW images recorded in the recording medium include a RAW image generated by bracketing photographing or continuous shoot photographing, the RAW image generated by bracketing photographing or continuous shoot photographing is preferentially subjected to the development.

7. An imaging apparatus comprising:
one or more processors or circuits which function as
an imaging unit;
a recording unit recording, in a recording medium, RAW image data generated by the imaging unit without development processing;
a first development unit configured to subject the RAW image data recorded in the recording unit to the development processing, to generate a first developed image; and
a determining unit configured to determine an operation mode of the imaging apparatus, wherein
the first development unit changes an order of the developments of a plurality of RAW images recorded in the recording medium, according to kinds of the operation modes of the imaging apparatus determined by the determining unit, such that, when the plurality of RAW images recorded in the recording medium include a RAW image to be subjected to a special processing of print out or of transferring to an external apparatus, the RAW image to be subjected to the special processing is preferentially subjected to the development.

8. A controlling method of an imaging apparatus comprising:
imaging;
recording, in a recording medium, RAW image data generated by the imaging without development processing;
developing to subject the RAW image data recorded in the recording medium to the development processing, to generate a first developed image;
determining an operation mode of the imaging apparatus; and
setting a priority in an order of the developments of a plurality of RAW images recorded in the recording medium, according to kinds of the operation modes of the imaging apparatus determined by the determining, such that, when the plurality of RAW images recorded in the recording medium include a RAW image to be subjected to a special processing of print out or of transferring to an external apparatus, the RAW image to be subjected to the special processing is preferentially subjected to the development.

9. A controlling method of an imaging apparatus comprising:

imaging;

recording, in a recording medium, RAW image data generated by the imaging without development processing;

developing to subject the RAW image data recorded in the recording unit to the development processing, to generate a first developed image; and determining an operation mode of the imaging apparatus, wherein, in the first developing, an order of the developments of a plurality of RAW images recorded in the recording medium is changed, according to kinds of the operation modes of the imaging apparatus determined by the determining, such that, when the plurality of RAW images recorded in the recording medium include a RAW image to be subjected to a special processing of print out or of transferring to an external apparatus, the RAW image to be subjected to the special processing is preferentially subjected to the development.

* * * * *